US010511932B2

United States Patent
Joo et al.

(10) Patent No.: US 10,511,932 B2
(45) Date of Patent: Dec. 17, 2019

(54) METHOD AND APPARATUS FOR OPERATING ELECTRONIC DEVICE BASED ON ENVIRONMENTAL INFORMATION

(71) Applicant: Samsung Electronics Co., Ltd., Suwon-si, Gyeonggi-do (KR)

(72) Inventors: Jae-Seok Joo, Seongnam-si (KR); Jeong-Min Park, Hwaseong-si (KR); Tae-Ho Kim, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 15/355,796

(22) Filed: Nov. 18, 2016

(65) Prior Publication Data

US 2017/0146970 A1 May 25, 2017

(30) Foreign Application Priority Data

Nov. 20, 2015 (KR) .................... 10-2015-0163612

(51) Int. Cl.
*G05B 19/042* (2006.01)
*H04W 4/021* (2018.01)

(52) U.S. Cl.
CPC .......... *H04W 4/021* (2013.01); *G05B 19/042* (2013.01); *G05B 2219/23227* (2013.01);
(Continued)

(58) Field of Classification Search
CPC ..... G05B 19/0428; G05B 2219/23227; H04W 4/021; Y02D 70/168; Y02D 70/26;
(Continued)

(56) References Cited

U.S. PATENT DOCUMENTS 6,084,510 A * 7/2000 Lemelson ............ G08B 15/004
340/539.13
8,558,850 B2 * 10/2013 Cunningham .......... G06F 16/29
345/645
(Continued)

FOREIGN PATENT DOCUMENTS

JP 2015-025714 A 2/2015
KR 10-1332205 B1 11/2013
(Continued)

OTHER PUBLICATIONS

Hanchen Jiang, Real-Time Safety Risk Assessment Based on a Real-Time Location System for Hydropower Construction Sites, 2014,e Scientific World Journal, vol. 2014, Article ID 235970, pp. 1-14 (Year: 2014).*

*Primary Examiner* — Brian W Wathen
*Assistant Examiner* — Hung H Dang
(74) *Attorney, Agent, or Firm* — Jefferson IP Law, LLP

(57) ABSTRACT

A method and apparatus for operating an electronic device based on environmental information are provided. The electronic device includes sensors functionally connected to the electronic device; and at least one processor configured to: receive, at least one sensor of the sensors, environmental information corresponding to a surrounding area of the electronic device, determine a risk level based on the environmental information, perform a first function if the risk level satisfies a first condition, and perform a second function if the risk level satisfies a second condition different from the first condition.

19 Claims, 24 Drawing Sheets

(52) U.S. Cl.
CPC ...... *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ............. Y02D 70/142; Y02D 70/1262; Y02D 70/144; Y02D 70/164; Y02D 70/1242; Y02D 70/166
See application file for complete search history.

(56) References Cited

U.S. PATENT DOCUMENTS

| | | | |
|---|---|---|---|
| 8,620,344 B2 | 12/2013 | Huang et al. | |
| 9,215,560 B1* | 12/2015 | Jernigan | H04W 4/021 |
| 9,792,368 B1* | 10/2017 | Amacker | H04W 4/04 |
| 2010/0120450 A1 | 5/2010 | Herz | |
| 2012/0105243 A1* | 5/2012 | Datodi | G08B 27/008 340/686.6 |
| 2013/0099977 A1 | 4/2013 | Sheshadri et al. | |
| 2014/0019044 A1 | 1/2014 | Zanutta et al. | |
| 2014/0032015 A1 | 1/2014 | Chun et al. | |
| 2014/0274150 A1 | 9/2014 | Marti et al. | |
| 2015/0148061 A1* | 5/2015 | Koukoumidis | H04W 4/022 455/456.1 |
| 2015/0168174 A1* | 6/2015 | Abramson | G01C 21/3697 701/408 |
| 2015/0245189 A1* | 8/2015 | Nalluri | G06Q 50/265 455/404.1 |
| 2016/0057572 A1* | 2/2016 | Bojorquez Alfaro | H04W 4/021 455/411 |

FOREIGN PATENT DOCUMENTS

| | | |
|---|---|---|
| KR | 10-2014-0016463 A | 2/2014 |
| KR | 10-2014-0033786 A | 3/2014 |

* cited by examiner

METHOD AND APPARATUS FOR OPERATING ELECTRONIC DEVICE BASED ON ENVIRONMENTAL INFORMATION

CROSS-REFERENCE TO RELATED APPLICATION(S)

This application claims the benefit under 35 U.S.C. § 119(a) of a Korean patent application filed on Nov. 20, 2015 in the Korean Intellectual Property Office and assigned serial number 10-2015-0163612, the entire disclosure of which is hereby incorporated by reference.

TECHNICAL FIELD

The present disclosure relates to a method and apparatus for operating an electronic device based on environmental information.

BACKGROUND

An electronic device may perform various functions in combination, and for example, portable terminals such as smart phones are implemented to have an advanced performance and are developed to provide more convenience to a user.

The electronic device may provide functions using sensors among various functions. These sensors may collect information related to the electronic device and an exterior thereof, or information on a user of the electronic device.

The electronic device may include one or more sensors, and provide various services using information collected through various sensors.

The above information is presented as background information only to assist with an understanding of the present disclosure. No determination has been made, and no assertion is made, as to whether any of the above might be applicable as prior art with regard to the present disclosure.

SUMMARY

At least one sensor included in the electronic device may operate in response to a predetermined condition or a user request. The electronic device may receive environmental information from an external electronic device (e.g., a server), and provide information (for example, notifications, alerts, current status, etc.) to a user based on the received environmental information. In addition, the electronic device may monitor a state associated with the environmental information received from the external electronic device, using at least one sensor.

However, since the electronic device may operate only according to a predetermined condition or a user request when monitoring the state related to the environmental information, information on the current state may not be immediately provided to a user.

Aspects of the present disclosure are to address at least the above-mentioned problems and/or disadvantages and to provide at least the advantages described below. Accordingly, an aspect of the present disclosure is to provide an apparatus and method for operating an electronic device based on environmental information such that the electronic device may receive the environmental information from an external electronic device and control operations of various sensors included in the electronic device based on the received environmental information.

In accordance with an aspect of the present disclosure, an electronic device is provided. The electronic device includes sensors functionally connected to the electronic device; and at least one processor configured to: receive, at least one sensor of the sensors, environmental information corresponding to a surrounding area of the electronic device, determine a risk level based on the environmental information, perform a first function if the risk level satisfies a first condition, and perform a second function if the risk level satisfies a second condition different from the first condition.

In accordance with another aspect of the present disclosure, an operation method for an electronic device is provided. The method for controlling an electronic device based on a state of a surrounding environment includes receiving, at least one senor, environmental information corresponding to a surrounding area of the electronic device; determining a risk level based on the environmental information; performing a first function if the risk level satisfies a first condition, and performing a second function if the risk level satisfies a second condition different from the first condition.

In accordance with an aspect of the present disclosure, a non-transitory computer-readable recording medium having instructions stored therein and being executed by at least one processor is provided. The non-transitory computer-readable recordable medium includes instructions being configured to acquire environmental information corresponding to a surrounding area; determine a risk level based on the environmental information; perform a first function if the risk level satisfies a first condition, and perform a second function if the risk level satisfies a second condition different from the first condition.

In accordance with an aspect of the present disclosure, an operating method of an electronic device based on a geo-fence is provided. The operating method includes receiving, from an external electronic device, environmental information about information of dust, fine dust, micro dust, ozone, ultraviolet (UV) light, temperature, atmospheric pressure, humidity, and disasters, diseases, accidents, or the like, which are associated with the surrounding area of the electronic device, determining a geo-fence corresponding to the environmental information, and when entering the geo-fence, starting operations for specific sensors associated with the environmental information, among various sensors of the electronic device, or changing a sensing period, using location information such as a base station signal, global positioning system (GPS) satellite signals, and the like. Therefore, operating conditions of the various sensors can be controlled according to the degree of contamination in a surrounding environment so as to minimize the power consumption of the electronic device and also provide, to the user, a rapid and precise guide according to the change of the contamination degree of the surrounding environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures

DETAILED DESCRIPTION

Figure 1:
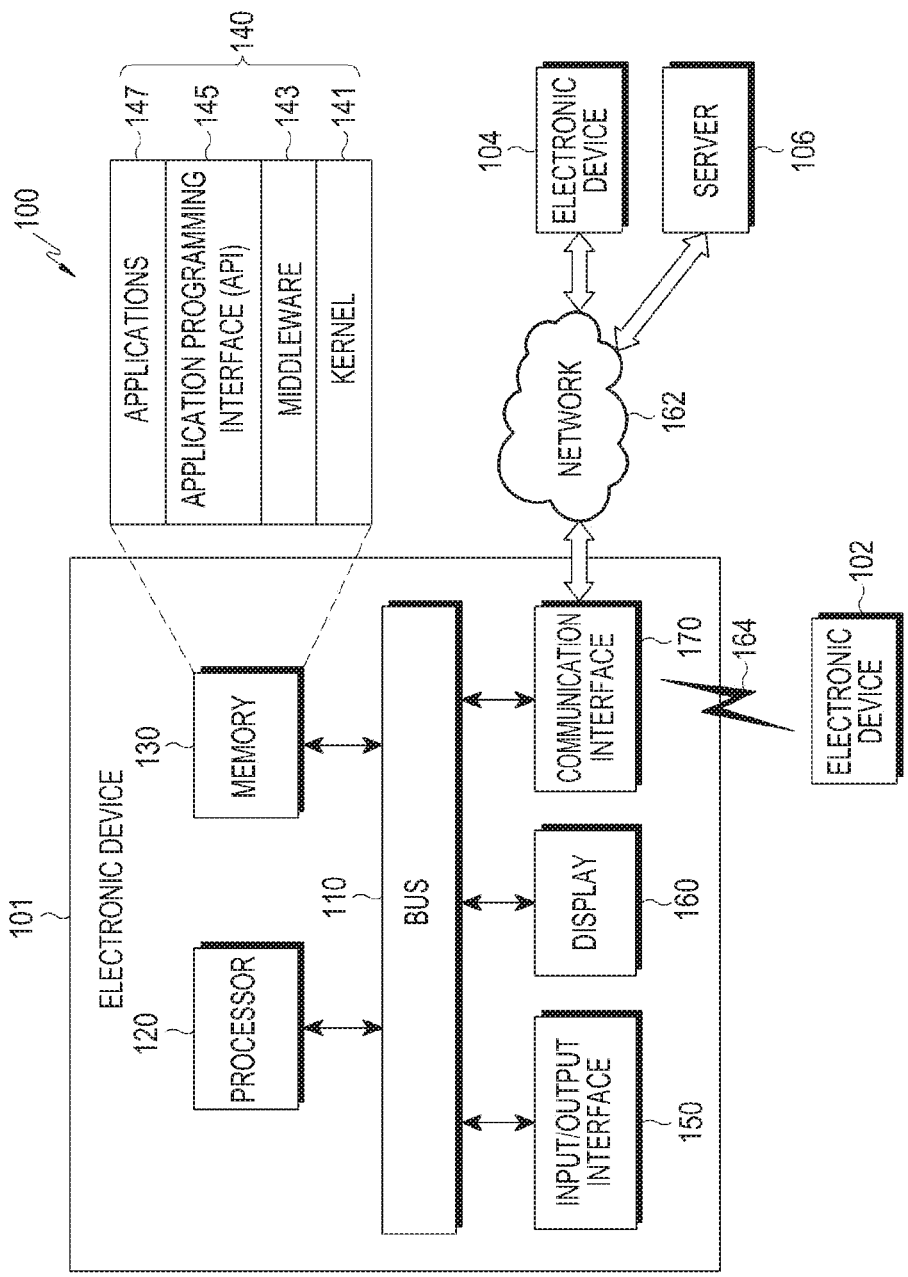
FIG. 1 is a block diagram illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both are user devices, regardless of the order or the importance. For example, a first element may be termed a second element, and similarly, a second element may be termed a first element without departing from the scope of the present disclosure.

It should be understood that when an element (e.g., first element) is referred to as being (operatively or communicatively) "connected", or "coupled", to another element (e.g., second element), it may be directly connected or coupled directly to the other element or any other element (e.g., third element) may be interposer between the different elements. In contrast, it may be understood that when an element (e.g., first element) is referred to as being "directly connected", or "directly coupled" to another element (second element), there are no element (e.g., third element) interposed between the different elements.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

FIG. 1 is a block diagram illustrating an electronic device 101 in a network environment 100 according to an embodiment of the present disclosure.

Referring to FIG. 1, the electronic device 101 may include a bus 110, a processor 120, a memory 130, an input/output interface 150, a display 160, and a communication interface 170. In any embodiment, the electronic device 101 may omit at least some of the above components or further include other components.

The bus 110 may include, for example, a circuit for connecting the elements and transmitting communication between the elements (for example, control messages and/or data).

The processor 120 may include one or more of a central processing unit (CPU), an application processor (AP), and a communication processor (CP). For example, the processor 120 may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

For example, the kernel 141 may control or manage the system resources (e.g., the bus 110, the processor 120, the memory 130, etc.) that are used to execute operations or functions implemented in the other programs (e.g., the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (e.g., the bus 110, the processor 120, the memory 130, etc.) of the electronic device 101 to one or more of the application programs 147. For example, the middleware 143 may perform scheduling or loading balancing on the one or more task requests by processing the one or more task requests according to the priorities assigned to the one or more application programs.

The API 145, which is an interface through which the application programs 147 control functions provided from the kernel 141 or the middleware 143, may include, for example, at least one interface or function (e.g., instruction) for file control, window control, image processing, text control, etc.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

Examples of the display 160 may include a liquid crystal display (LCD), a light-emitting diode (LED) display, an organic light-emitting diode (OLED) display, a micro-electro-mechanical systems (MEMS) display, and an electronic paper display. The display 160 may display, for example, various types of contents (e.g., text, images, videos, icons, symbols, etc.) for a user. The display 160 may include a touch screen and may receive, for example, a touch, gesture, proximity, or hovering input using an electronic pen or the user's body part.

The communication interface 170 may configure communication, for example, between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use, for example, at least one of long term evolution (LTE), LTE-Advance (LTE-A), code division multiple access (CDMA), Wideband CDMA (WCDMA), universal mobile telecommunications system (UMTS), Wireless Broadband (WiBro), Global System for Mobile Communications (GSM), and the like, as a cellular communication protocol. In addition, the wireless communication may include, for example, short range communication 164. The short range communication 164 may include, for example, at least one of Wireless Fidelity (Wi-Fi™), Bluetooth™ (BT), near field communication (NFC), global navigation satellite system (GNSS), etc. The GNSS may include at least one of, for example, a global positioning system (GPS), a global navigation satellite system (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include an interface device, for example, at least one of a universal serial bus (USB) port, a high definition multimedia interface (HDMI) port, Recommended Standard number 232 (RS-232) port, and a plain old telephone service (POTS) port. The network 162 may include a telecommunication network, for example, at least one of a computer network (e.g., a local area network (LAN) or a wide area network (WAN)), the Internet, and a telephone network.

Each of the first external electronic device 102 and the second external electronic device 104 may be of the same or a different type from the electronic device 101. According to an embodiment, the server 106 may include a group of one or more servers. According to various embodiments, all or some of the operations performed by the electronic device 101 may be performed by another electronic device or a plurality of electronic devices (for example, the first external electronic device 102, the second external electronic device 104, or the server 106). According to an embodiment, when the electronic device 101 should perform some functions or services automatically or by request, the electronic device 101 may make a request for performing at least some of the functions related to the functions or services to another device (for example, the first external electronic device 102, the second external electronic device 104, or the server 106) instead of performing the functions or services at the electronic device 101. Another electronic device (for example, the first external electronic device 102, the second external electronic device 104, or the server 106) may execute the requested functions or the additional functions, and may deliver a result of the execution to the electronic device 101. The electronic device 101 may provide the received result as it is or additionally process the received result and provide the requested functions or services. To this end, for example, cloud computing, distributed computing, or client-server computing technology may be used.

Figure 2:
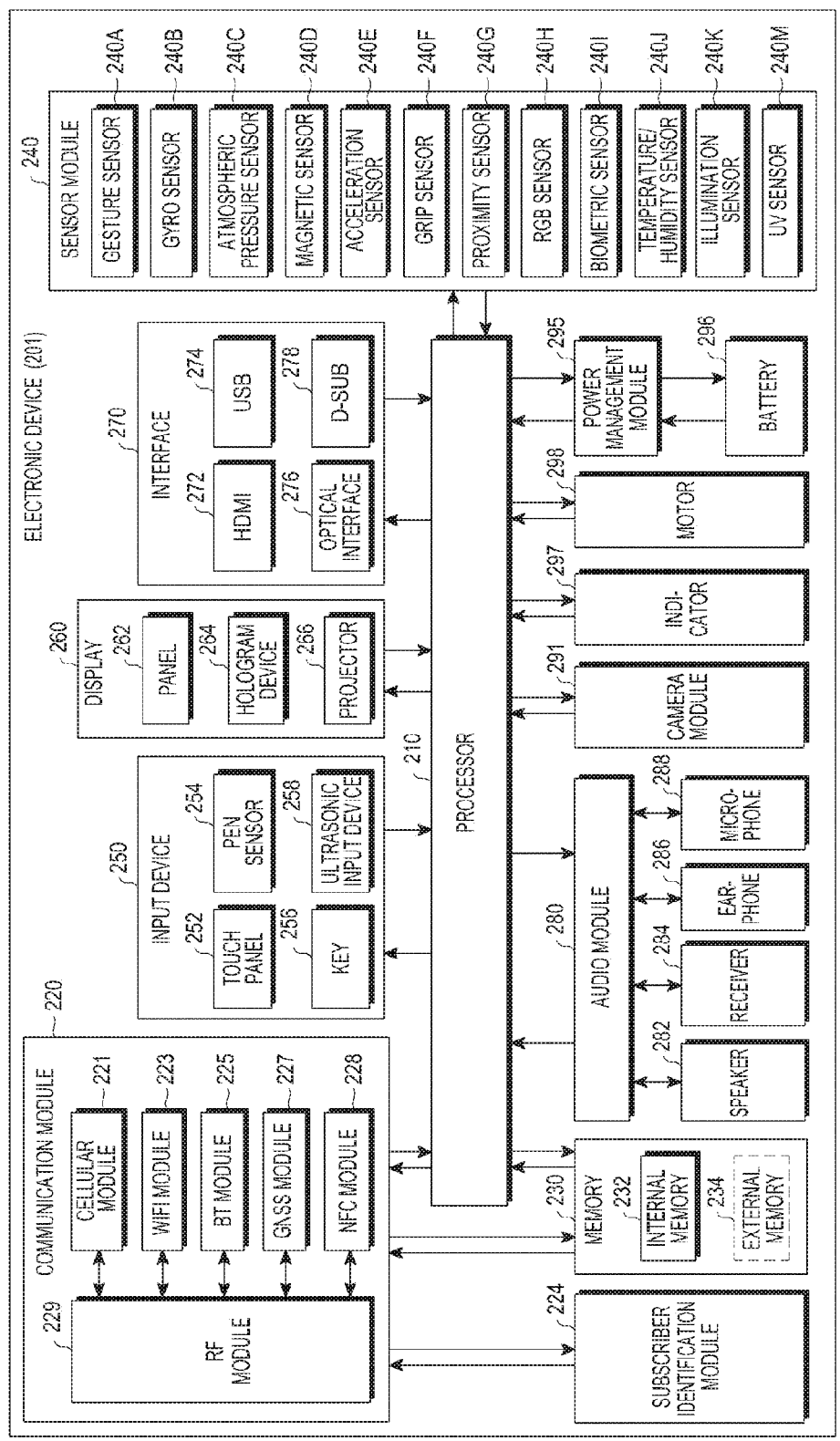
FIG. 2 is a block diagram of an electronic device according to an embodiment of the present disclosure.

FIG. 2 is a block diagram of an electronic device according to an embodiment of the present disclosure.

The electronic device 201 may include, for example, the entirety or a part of the electronic device 101 illustrated in FIG. 1. The electronic device 201 may include at least one processor (e.g., an AP processor) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a system on chip (SoC). According to an embodiment, the processor 210 may further include a graphic processing unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory) to process the loaded instructions or data, and may store various types of data in the non-volatile memory.

The communication module 220 may have a configuration that is the same as, or similar to, that of the communication interface 170 illustrated in FIG. 1. The communication module 220 may include, for example, a cellular module 221, a Wi-Fi™ module 223, a BT module 225, a GNSS module 227, an NFC module 228, and a radio frequency (RF) module 229.

The cellular module 221 may be used to establish communication, for example, a voice call, a video call, a text message service, an Internet service, or the like through a communication network. According to an embodiment, the cellular module 221 may identify and authenticate the electronic device 201 within a communication network using a subscriber identification module (for example, the SIM card 224). According to an embodiment, the cellular module 221 may perform at least some of the functions that the processor 210 may provide. According to an embodiment, the cellular module 221 may include a CP.

The Wi-Fi™ module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi™ module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), an antenna, or the like. According to another embodiment, at least one of the cellular module 221, the Wi-Fi™ module 223, the BT module 225, the GNSS module 227, and the NFC module 228 may transmit/receive an RF signal through a separate RF module 229.

The subscriber identification module may include, for example, a SIM card 224 that includes a subscriber identification module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard disc drive, a solid state drive (SSD), etc.).

The external memory 234 may further include a flash drive, for example, a compact flash (CF), a secure digital (SD), a micro secure digital (Micro-SD), a mini secure digital (Mini-SD), an eXtreme Digital (xD), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and an ultraviolet (UV) sensor 240M. Additionally, or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel 252. The key 256 may include, for example, a physical button, an optical key, or a keypad. The ultrasonic input device 258 may detect an ultrasonic wave using a microphone (for example, the microphone 288) of the electronic device 201 through an input tool generating an ultrasonic signal to identify data.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional (3D) image in the air by using an interference of light. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include, for example, a HDMI port 272, a USB port 274, an optical interface port 276, or a D-subminiature (D-sub) port 278. The interface 270 may be included, for example, in the communication interface 170 illustrated in FIG. 1. Additionally, or alternatively, the interface 270 may, for example, include a mobile high-definition link (MHL) interface, an SD card/multi-media card (MMC) interface, and/or an infrared data association (IrDA) standard interface.

The audio module 280 may, for example, convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, etc.

The camera module 291 is a device which may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 295 may manage, for example, the power of the electronic device 201. According to an embodiment, the power management module 295 may include a power management integrated circuit (PMIC), a charger integrated circuit (IC), or a battery 296 or fuel gauge. The PMIC may have a wired and/or wireless charging method. Examples of the wireless charging method may include a magnetic resonance method, a magnetic induction method, an electromagnetic wave method, or the like. Additional circuits (e.g., a coil loop, a resonance circuit, a rectifier, etc.) for wireless charging may be further included. The battery gauge may measure, for example, the residual amount of power corresponding to the battery 296 and a voltage, current, and/or temperature while charging. The battery 296 may include, for example, a rechargeable battery and/or a solar battery.

The indicator 297 may indicate a particular state (e.g., a booting state, a message state, a charging state, etc.) of the electronic device 201 or a part (e.g., the processor 210) thereof. The motor 298 may convert an electrical signal into a mechanical vibration and may generate a vibration, a haptic effect, or the like. Although not illustrated, the electronic device 201 may include a processing unit (e.g., a GPU) for supporting mobile TV. The processing unit for supporting the mobile TV may process media data according to a standard, such as digital multimedia broadcasting (DMB), digital video broadcasting (DVB), MediaFlo™, etc.

Each of the above-described component elements of hardware according to the present disclosure may be configured with one or more components, and the names of the corresponding component elements may vary based on the type of electronic device. The electronic device 201 according to various embodiments of the present disclosure may include at least one of the aforementioned elements. Some elements may be omitted or other additional elements may be further included in the electronic device. Further, some of the components of the electronic device 201 according to the various embodiments of the present disclosure may be combined to form a single entity, and thus, may equivalently execute functions of the corresponding elements prior to the combination.

Figure 3:
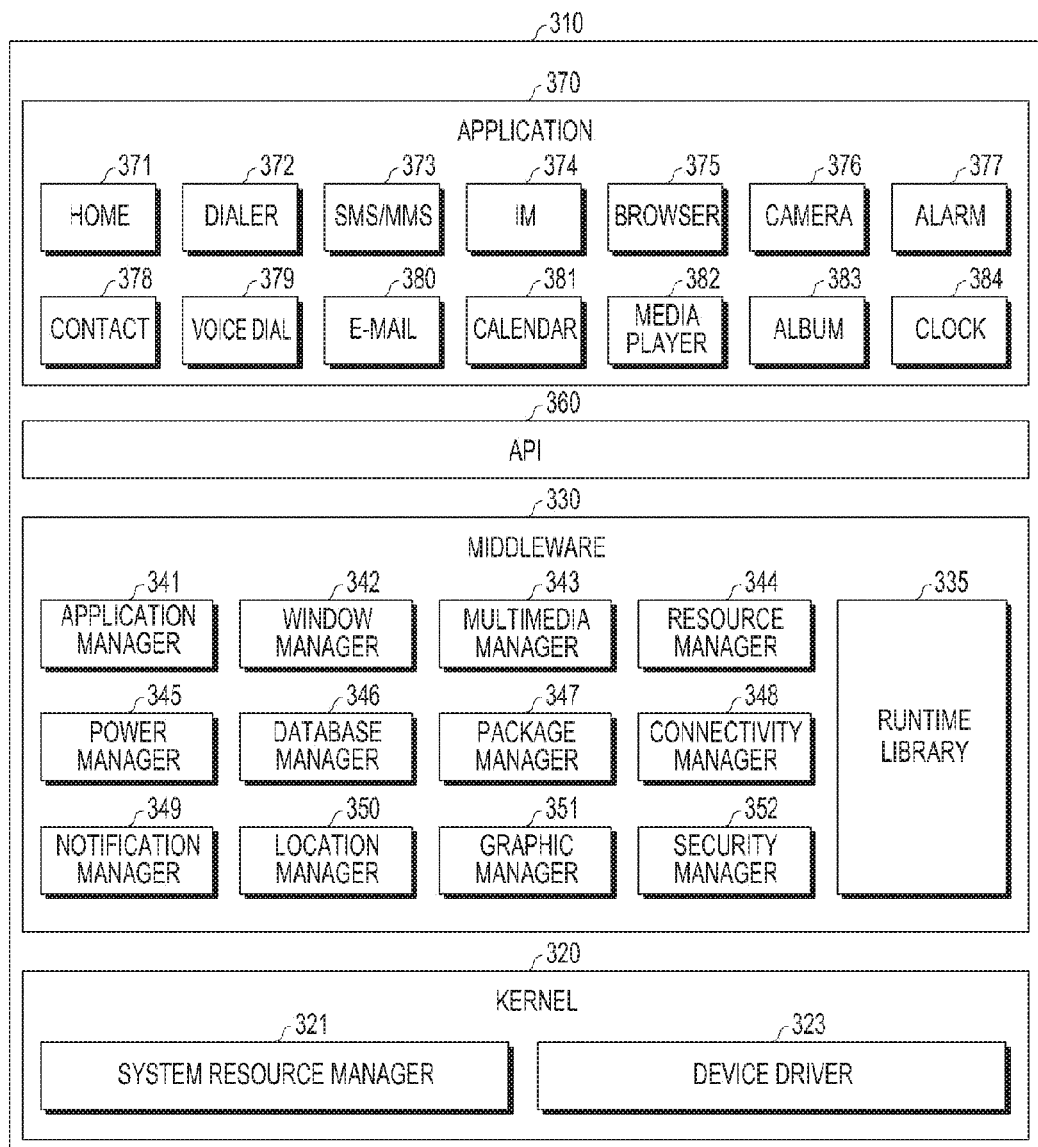
FIG. 3 is a block diagram of a program module according to an embodiment of the present disclosure.

FIG. 3 is a block diagram of a program module according to an embodiment of the present disclosure.

According to an embodiment, a program module 310 (for example, the program 140) may include an OS for controlling resources related to the electronic device (for example, the electronic device 101) and/or various applications (for example, the application programs 147) executed in the operating system. The operating system may be, for example, Android™, iOS™, Windows™, Symbian™, Tizen™, Bada™, etc.

The program module 310 may include a kernel 320, middleware 330, an API 360, and/or applications 370. At least some of the program module 310 may be preloaded on an electronic device, or may be downloaded from an external electronic device (for example, the first external electronic device 102, the second external electronic device 104, or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a BT driver, a shared memory driver, a USB driver, a keypad driver, a Wi-Fi™ driver, an audio driver, or an inter-process communication (IPC) driver.

The middleware 330 may provide a function required by the applications 370 in common, or may provide various functions to the applications 370 through the API 360 such that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, etc.

The application manager 341 may manage, for example, the life cycle of at least one of the applications 370. The window manager 342 may manage graphical user interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a basic input/output system (BIOS) to manage a battery or power and provide power information required for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi™, BT, or the like. The notification manager 349 may display or notify of an event, such as an arrival message, an appointment, a proximity notification, etc., in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, or the like. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided with different configurations according to operating systems. For example, in the case of Android™ or iOS™, one API set may be provided for each platform, and in the case of Tizen™, two or more API sets may be provided for each platform.

The applications 370 (for example, the application programs 147) may include, for example, one or more applications which can provide functions such as home 371, dialer 372, short message service (SMS)/multi-media message service (MMS) 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environmental information (for example, atmospheric pressure, humidity, or temperature information).

According to an embodiment, the applications 370 may include an application (hereinafter, referred to as an "information exchange application" for convenience of description) that supports information exchange between the electronic device (e.g., the electronic device 101) and an external electronic device (e.g., the first external electronic device 102 or the second external electronic device 104). The information exchange application may include, for example, a notification relay application for transferring specific information to an external electronic device or a device management application for managing an external electronic device.

For example, the notification relay application may include a function of transferring, to the external electronic device (e.g., the first external electronic device 102 or the second external electronic device 104), notification information that is generated from the other applications (e.g., the SMS/MMS application, the e-mail application, the health care application, the environmental information application, etc.) of the electronic device. Furthermore, the notification relay application may, for example, receive notification information from the external electronic device and may provide the received notification information to a user.

The device management application may manage (for example, install, delete, or update), for example, at least one function of an external electronic device (for example, the first external electronic device 102 or the second external electronic device 104) communicating with the electronic device (for example, a function of turning on/off the external electronic device (or some components) or a function of adjusting luminance (or a resolution) of a display of the external electronic device), applications operating in the external electronic device, or services provided by the external electronic device (for example, a call service and a message service).

According to an embodiment, the applications 370 may include an application (for example, a health care application of a mobile medical device or the like) designated according to an attribute of the external electronic device (for example, the first external electronic device 102 or the second external electronic device 104). According to an embodiment, the applications 370 may include an application received from the external electronic device (for example, the server 106, the first external electronic device 102, or the second external electronic device 104). According to an embodiment, the applications 370 may include preloaded applications or third-party applications that can be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least a part of the program module 310 may be implemented (e.g., executed), for example, by a processor (e.g., the processor 120). At least some of the program module 310 may include, for example, a module, a program, a routine, a set of instructions, and/or a process for performing one or more functions.

The term "module" as used herein may, for example, mean an element including one of hardware, software, firmware, and/or a combination of two or more thereof. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented.

For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4A:
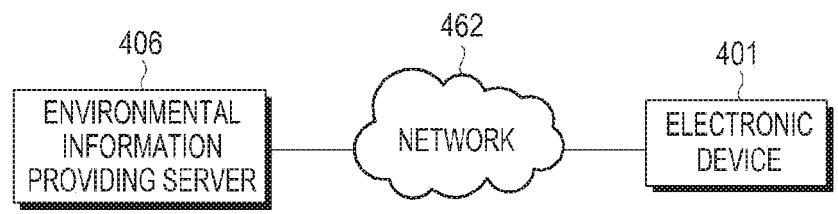
FIG. 4A is a diagram illustrating a system for operating an electronic device based on environmental information according to an embodiment of the present disclosure.
Figure 4B:
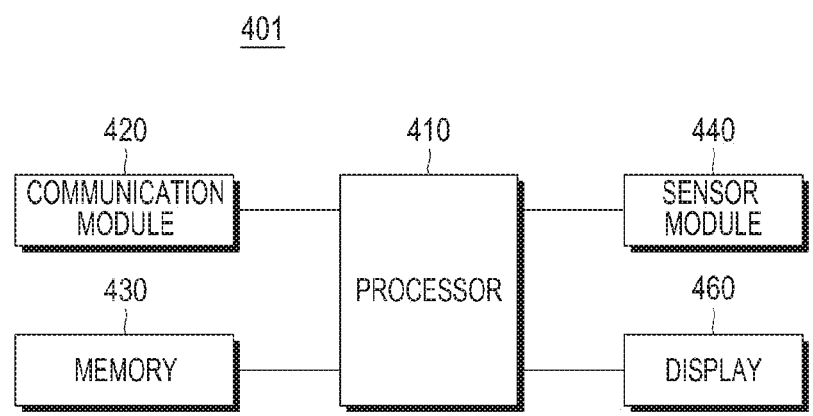
FIG. 4B is a block diagram of an electronic device for an operation based on environmental information according to an embodiment of the present disclosure.

FIG. 4A is a diagram illustrating a system for an operation of an electronic device based on environmental information according to an embodiment of the present disclosure, and FIG. 4B is a block diagram of an electronic device for an operation based on environmental information according to an embodiment of the present disclosure.

Referring to FIG. 4A, a system for an operation of a sensor based on a geo-fence in accordance with various embodiments of the present disclosure may include an environmental information providing server 406, a communication network 462, an electronic device 401, and the like.

The environmental information providing server 406 performs a function of generating environmental information on a local area and transmitting the same to the electronic device 401. Here, the transmitted environmental information may include forecast information which forecasts atmospheric conditions such as dust, fine dust, micro dust, ozone, or ultraviolet light, temperature, atmospheric pressure, humidity, etc., which are linked to a local area, and may include a special weather report provided in real time. In addition, the environmental information may include alarm information, which issues an alarm about a dangerous situation such as disasters, diseases, accidents, etc. In addition, the environmental information may be sensing data, which has been measured through sensors of multiple electronic devices (e.g., a plurality of user equipment devices) and collected by the server. The environmental information providing server 406 may be, for example, a server that is operating in a national institution such as a National Weather Service, National Disaster Information Center, etc. In addition, the environmental information providing server 406 may use cloud computing, distributed computing, or client-server computing technologies. According to an embodiment, the electronic device 401 may acquire environmental information based on the information collected at the electronic device 401. According to an embodiment, the electronic device 401 may acquire information on dust, fine dust, micro dust, ozone, ultraviolet light, temperature, atmospheric pressure, humidity, or the like through at least one sensor functionally connected to the electronic device 401. According to an embodiment, the electronic device 401 may receive the environmental information through an external electronic device (not shown). For example, the environmental information may be acquired through sensors (e.g., an Internet of things (IOT) sensor) located in a neighborhood or within a predetermined geographic area corresponding to the electronic device 401 or other electronic devices (e.g., a television (TV), a mobile phone, etc.) located in a neighborhood or within a predetermined geographic area corresponding to the electronic device 401.

Further, the environmental information may include at least one of information types (for example, dust, fine dust, micro dust, ozone, ultraviolet light, temperature, atmospheric pressure, humidity, disasters, diseases, accidents, etc.), local area information associated with the information, and the risk level of information (for example, the concentration of dust, the concentration of fine dust, the concentration of micro dust, the concentration of ozone, a UV index, temperature, pressure, humidity, an earthquake intensity, tidal wave strength, gas leakage, etc.).

In addition, the environmental information may be local area information and include at least one of location information including latitude and longitude coordinates, map information indicating by color an area associated with the environmental information, an information type, local area information, text information that represents the risk level of information as text, and geo-fence information which is configured for an area associated with the environmental information. According to an embodiment, the local information may acquire local area information through a GPS sensor included inside the electronic device 401 or sensors (for example, an IOT sensor) of an external electronic device (for example, an access point, a base station, etc.) located in a neighborhood or geographic area surrounding the location of the electronic device 401.

As described above, the environmental information transmitted by the environmental information providing server 406 is transmitted to the electronic device 401 through the communication network 462. Here, the electronic device 401 may be various types of electronic devices.

The communication network 462 may be configured irrespective of an aspect of communication such as wired/wireless communication, and may be configured as various communication networks including a personal area network (PAN), a LAN, a metropolitan area network (MAN), a wide area network (WAN) and the like. Further, the communication network 462 may be a known World Wide Web (WWW), and may use a wireless transmission technology utilized for a short distance communication such as Infrared Data Association (IrDA) or BT. In addition, the communication network 462 may include a cable TV broadcast communication network, a terrestrial broadcast communication network, satellite broadcast communication network, or the like for receiving broadcast signals from the electronic device 401.

The electronic device 401, which receives the environmental information from the environmental information providing server 406 through the communication network 462, may determine a geo-fence corresponding to environmental information based on the environmental information received according to various embodiments of the present disclosure, and may control the operation of at least one sensor in association with the environmental information according to the determined geo-fence and the location of the electronic device 401.

Referring to FIG. 4B, the electronic device 401 according to various embodiments of the present disclosure may include a processor 410, a communication module 420, a memory 430, a sensor module 440, a display 460, and the like.

The communication module 420 may receive the environmental information from the environmental information providing server 406 and provides the same to the processor 410. The communication module 420 may connect a communications session to another electronic device and perform data communication therebetween. For example, the communication module 420 may include all or a part of the communication module 220 shown in FIG. 2. The communication module 420 may be connected to the communication network 462 through wireless communication to communicate with another electronic device. The wireless communication may use at least one of, for example, Wi-Fi™, BT, NFC, or GNSS, or cellular communication (for example, LTE, LTE-A, CDMA, WCDMA, UMTS, WiBro, or GSM. In addition, the communication module 420 may include an interface device for wired communication, for example, at least one of a USB port, a HDMI port, a RS-232 port, and a POTS port. In addition, the communication module 420 may perform positioning of the location of the electronic device 401 and provides the same to the processor 410. The communication module 420 may perform positioning of the location of the electronic device 401, using at least one of a GNSS module, a Wi-Fi™ module, and a cellular module.

The memory 430 may store information such as data and application data required for providing a function according to various embodiments of the present disclosure, and store the environmental information, which is received according to various embodiments of the present disclosure, and a geo-fence, which is determined based on the received environmental information. The memory 430 may include a volatile memory and/or a non-volatile memory. The electronic device 401 may include, for example, the whole or part of the electronic device 201 illustrated in FIG. 2. The memory 430 may store commands or data related to one or more other elements of the electronic device 401. The memory 430 may store signals or data to be input/output so as to correspond to the operations of the processor 410, the communication module 420, the sensor module 440, and the display 460, under the control of the processor 410.

The sensor module 440 may measure a physical quantity or sense an operational state of the electronic device 401 and may convert the measured or sensed information to an electric signal. The sensor module 440 may include, for example, all or a part of the sensor module 240 illustrated in FIG. 2. The sensor module 440 may include a gesture sensor, a gyro sensor, an atmospheric pressure sensor, a magnetic sensor, an acceleration sensor, a grip sensor, a proximity sensor, a color sensor (for example, RGB sensor), a biometric sensor, a temperature/humidity sensor, light sensor, or a UV sensor, an olfactory sensor, an EMG sensor, an EEG sensor, an ECG sensor, an IR sensor, an iris sensor, and/or a fingerprint sensor. The sensor module 440 may further include a control circuit for controlling one or more sensors included therein. In various embodiments of the present disclosure, the sensor module 440 may be distinguished from their use, as at least one environmental sensor capable of detecting an environment in the neighborhood of the electronic device 401, that is, atmospheric conditions, at least one state detection sensor capable of detecting an operation state of the electronic device 401, and at least one biological detection sensor capable of measuring a biological detection signal from the user. For example, the environmental sensor may include at least one of a UV sensor that can measure ultraviolet figures, a CO2 sensor that can measure carbon dioxide in the atmosphere, a CO sensor that can measure carbon monoxide in the atmosphere, a fine dust sensor that can measure the concentration of dust in the atmosphere, an atmospheric pressure sensor that can measure atmospheric pressure, a humidity sensor that can measure the humidity in the atmosphere, a temperature sensor that can measure the temperature in the atmosphere, and an E-nose sensor that can measure hazardous substances in the atmosphere (for example, ammonia, methyl mercaptan, hydrogen sulfide, dimethyl sulfide, dimethyl disulfide, trimethylamine, acetaldehyde, styrene, propionaldehyde, butyric aldehyde, n-valeric aldehyde, i-valeric aldehyde, toluene, xylene, methyl ethyl ketone, butyl acetate, methyl isobutyl butyl ketone, propionic acid, n-butyric acid, n-valeric acid, i-valeric acid, i-butyric aldehyde alcohol, etc.). In addition, the state detection sensor may include at least one of an acceleration sensor, a gyro sensor, a geomagnetic sensor, an altitude sensor, a proximity sensor, a light sensor. In addition, the biometric sensor may include one or more sensors which can acquire raw data for measuring one or more of the user's blood pressure, blood flow, heart rate (heart rate monitor (HRM), heart rate variability (HRV)), body temperature, respiratory rate, oxygen saturation, cardiopulmonary sound detection, glucose, waist line, height, weight, body fat, calorie consumption amount, brainwave, voice, skin resistance, electromyogram, electrocardiogram, walk, ultrasound images, dilation of pupils, or blinking.

The display 460 may be a 'touch screen' and provide a graphical user interface when a sensing service based on the geo-fence is provided to the user. The display 460 may include, for example, all or a part of the display 460 illustrated in FIG. 2. The display 460 may receive, for example, various gesture inputs such as at least one of the proximity or touch, through the user's body (for example, a finger including the thumb thereof) or a touchable input device, for example, a pen or stylus. The display 460, for example, may be implemented in various types including a resistive type, a capacitive type, an infrared type, or an acoustic wave type.

The processor 410 may include, for example, all or a part of the electronic device 201 illustrated in FIG. 2. The processor 410 may include one or more of a CPU, an AP, and a CP. The processor 410 may process at least a part of the information acquired from other elements of the electronic device 401 (for example, the communication module 420, the memory 430, the sensor module 440, the display 460, etc.) and provide the processed information to the user using various methods. According to various embodiments of the present disclosure, the processor 410 may control all the elements of the electronic device 401.

The processor 410 may receive environmental information on the local area through the communications module 420. In addition, the processor 410 may acquire the environmental information on the local area by using at least one sensor functionally connected to the electronic device 401. The processor 410 may acquire the risk level corresponding to the environmental information based on the environmental information. The processor 410 may perform a first function in relation to the environmental information when the risk level is a first condition, and may perform a second function in relation to the environmental information when the risk level is a second condition. Here, the environmental information may include information indicating the types of information, for example, dust, fine dust, micro dust, ozone, ultraviolet light, temperature, atmospheric pressure/barometric pressure, humidity, disasters, accidents, diseases, or the like. Further, the environmental information may be local area information and include at least one of location information including latitude and longitude coordinates, map information indicating by color an area associated with the environmental information, an information type, local area information, text information that represents the risk level of information as text, and geo-fence information which is configured for an area associated with the environmental information. In addition, the risk level of the environmental information may be information indicating, as a numerical value or a ratio, the concentration of dust, the concentration of fine dust, the concentration of micro dust, the concentration of ozone, UV Index, temperature, atmospheric pressure, humidity, an earthquake intensity, tidal wave strength, gas leakage, etc. In addition, the first condition may include a case where the risk level is equal to or higher than a predetermined reference. In addition, the second condition may include a case where the risk level is lower than a predetermined reference. For example, when the risk level indicates an ultraviolet index and the reference of a predetermined UV Index is 100, a case where the risk level (UV index) is equal to or higher than 100 may satisfy the first condition, and a case where the risk level (UV index) is less than 99 may satisfy the second condition.

According to various embodiments, when the risk level is a first condition, the processor 410 may perform a first function in relation to the environmental information. The first function may be an operation of determining a geo-fence based on the environmental information. For example, when the environmental information includes location information including latitude and longitude coordinates, the processor 410 may determine the geo-fence using the location information included in the environmental information. The location information included in the environmental information may include one or more pieces of information including latitude and longitude coordinates. In addition, the environmental information may be associated with the types of environmental information (for example, dust, fine dust, micro dust, ozone, ultraviolet light, temperature, atmospheric pressure, humidity, disasters, diseases, accidents, etc.) and the risk level (for example, the concentration of dust, the concentration of fine dust, the concentration of micro dust, the concentration of ozone, a UV index, temperature, pressure, humidity, an earthquake intensity, tidal wave strength, gas leakage, etc.). The processor 410 may determine the geo-fence by using the types of environmental information, the risk level, and the local area information. The processor 410 may determine the geo-fence for each type of environmental information. The processor 410 may acquire the risk level, which corresponds to the environmental information on a local area and collect at least one piece of location information in which the risk level of the environmental information is equal to or higher than a predetermined reference so as to determine the geo-fence. For example, when one piece of location information having the risk level of the environmental information equal to or higher than the predetermined reference therein is present, the processor 410 may determine the point of the latitude and longitude coordinates of the location information as the center of the geo-fence, and define a constant radius with reference to the determined point to determine the geo-fence. In addition, when multiple pieces of location information having the risk level of the environmental information equal to or higher than the predetermined reference therein are present, the processor 410 may determine the geo-fence by connecting the outermost points of latitude and longitude coordinates of each location information. In addition, when the risk level of the environmental information is lower than the reference, the processor 410 may classify the corresponding area as a non-dangerous area and may not to specify the geo-fence. In addition, when a geo-fence which is determined in advance for the corresponding area exists, the processor 410 may adjust the range of the predetermined geo-fence on the basis of the risk level, or release the predetermined geo-fence.

For another example, when the environmental information includes map information representing by color an area associated with the environmental information, the processor 410 may determine the geo-fence using the map information included in the environmental information. The map information included in the environmental information may be map information of an image form, which displays by color areas where the risk level for each type of the environmental information is equal to or higher than a predetermined reference. The processor 410 may compare map information included in the environmental information with reference map information, by which latitude and longitude coordinates associated with the location information, that is, for respective points on the map can be acquired, extract location information corresponding to the area displayed on the map information, and determine the geo-fence by using the extracted location information. In addition, regarding areas where the risk level of the environmental information for each type of environmental information in the map information is lower than the predetermined reference, the processor 410 may classify the corresponding areas as non-dangerous areas and not to specify the geo-fence. In addition, when the predetermined geo-fence exists for the corresponding area, the processor 410 may adjust the range of the predetermined geo-fence on the basis of the risk level, or release the predetermined geo-fence.

For another example, when the environmental information includes text information in which the information types, local area information, and the risk level of the information are represented by text, the processor 410 may determine the geo-fence using the text information included in the environmental information. The text information included in the environmental information may be information in the form of messages in which the types of environmental information, the risk level, and local area information are represented by a text. The processor 410 may analyze a sentence structure of the text information included in the environmental information, extract location information corresponding to an area displayed in the text information, and determine the geo-fence by using the extracted location information. In addition, when the risk level of the text information is lower than a predetermined reference, the processor 410 may classify the corresponding area as a non-dangerous area and not to specify the geo-fence. In addition, when the predetermined geo-fence exists for the corresponding area, the processor 410 may adjust the range of the predetermined geo-fence on the basis of the risk level, or release the predetermined geo-fence.

For another example, when the environmental information includes geo-fence information which is configured for an area associated with the environmental information, the processor 410 may determine the geo-fence by using the geo-fence information included in the environmental information.

According to various embodiments, the processor 410 may use at least one sensor included in the sensor module 440, or acquire the user's biometric information received from the communication module 420. The processor 410 may determine the geo-fence by using the acquired user's biometric information. The processor 410 may determine the geo-fence by adjusting the range of the geo-fence according to the acquired user's biometric information. For example, the processor 410 may start the operation of sensors classified as the biometric sensor among one or more sensors included in the sensor module 440, and acquire the user's biometric information by using the biometric sensor. The user's biometric information may include at least one of the user's identification information, body information, health information, disease information, exercise information, activity information, and stress information. The processor 410 may analyze the acquired user's biometric information to determine an environmental factor to which the user is vulnerable. For example, when it is determined that the user has a respiratory disease through the analysis of the user's biometric information, the processor 410 may determine the geo-fence by adjusting the range thereof to be wide as long as the type of the environmental information relates to the fine dust and various toxic substances those are associated with the respiratory disease. On the other hand, when it is determined that the user is very healthy through the analysis of the user's biometric information, the processor 410 may determine the geo-fence by adjusting the range thereof to be narrow.

According to various embodiments, when the geo-fence is determined and there is another geo-fence, a part of which overlaps to or adjacent to the range of the determined geo-fence, the processor 410 may combine the range of the determined geo-fence and the range of the other geo-fence to determine the geo-fence. In a situation where the geo-fence is determined and the location of the user (for example, a location associated with the electronic device 401) is tracked, and the processor 410 may receive the environmental information which is the same as or similar to the type of the determined geo-fence with respect to an area adjacent to the user's moving direction, and when the degree of the received environmental information is equal to or greater than a predetermined reference or close to the determined geo-fence, the processor 410 may extend the determined geo-fence to an area adjacent to the user's moving direction to determine the geo-fence.

According to various embodiments, the processor 410 may determine at least one sensor associated with the environmental information on the basis of the environmental information. The processor 410 may determine at least one sensor associated with the type of the environmental information among the environment sensors included in the sensor module 440. For example, when the type of the environmental information is fine dust, the processor 410 may determine a fine dust sensor that can measure the concentration of the fine dust and an olfactory sensor that can measure various toxic substances, as a sensor associated with the environmental information.

According to various embodiments, when the geo-fence is determined on the basis of the environmental information, the processor 410 may acquire the location information of the electronic device 401. The processor 410 may perform positioning of the current location of the electronic device 401 by using the communication module 420, and compare the location information acquired by the location positioning and the geo-fence to determine the positional relationship between the electronic device 401 and the geo-fence. Then, the processor 410 may control the operation of at least one sensor, which is determined to correspond to the type of the geo-fence according to the determined positional relationship between the electronic device 401 and the geo-fence. For example, when it is determined that the electronic device 401 enters inside of the geo-fence according to the positional relationship between the electronic device 401 and the geo-fence, the processor 410 may start the operation of the sensor and acquire sensing data from the sensor. In addition, when it is determined that the electronic device 401 goes outside of the geo-fence according to the positional relationship between the electronic device 401 and the geo-fence, the processor 410 may stop the operation of the sensor. In addition, the processor 410 may determine the operating cycle of the sensor according to the positional relationship between the electronic device 401 and the geo-fence and acquire the sensing data according to the determined operating cycle of the sensor. In addition, the processor 410 may determine sensing sensitivity of the sensor according to the positional relationship between the electronic device 401 and the geo-fence and acquire the sensing data according to the determined sensing sensitivity of the sensor.

According to various embodiments, the processor 410 may request the environmental information providing server 406 to receive the environmental information in a predetermined period, or may request the environmental information server to transmit the environmental information when the environmental information is required. For example, the processor 410 may change a period during which the environmental information is received according to the positional relationship between the electronic device 401 and the geo-fence. The processor 410 may request the environmental information providing server 406 to transmit the environmental information every time the period is changed, or may request the environmental information providing server 406 to change the predetermined period.

According to various embodiments, the processor 410 may acquire the sensing data from the at least one sensor by controlling the operation of the sensor module 440, and provide a sensing service based on the geo-fence using the acquired sensing data. That is, when the degree of the acquired sensing data is equal to or greater than a predetermined reference, the user may be notified of an alarm indicating the risk due to the degree thereof. In addition, the processor 410 may transmit the acquired sensing data to the environmental information providing server 406. Then, the environmental information providing server 406 may receive sensing data from the multiple electronic devices, and provide again more accurate environmental information by using the sensing data to the electronic device 401.

According to various embodiments, the processor 410 may determine the state of the electronic device 401 by using at least one sensor included in the sensor module 440. The processor 410 may determine whether the at least one sensor is able to perform a sensing operation or not according to the state of the electronic device 401. For example, the processor 410 may determine that the electronic device 401 approaches the geo-fence of fine dust type in the operation of tracking the location of the electronic device 401. Then, the processor 410 may start an operation with respect to sensors classified as the state detection sensor among one or more sensors included in the sensor module 440, and determine the state of the electronic device 401 by using the state detection sensor. For example, when the environmental information is the fine dust, the processor 410 may determine whether the fine dust sensor or olfactory sensor is able to perform a sensing operation or not, which can measure the concentration of fine dust, according to the determined state of the electronic device 401. That is, the processor 410 may determine whether the electronic device 401 is located in an open space or located at a confined space such as a bag. Since the fine dust sensor or olfactory sensor may be activated in an open space, when the electronic device 401 is located at an open space, it can be determined that the fine dust sensor or olfactory sensor may be activated, and when the electronic device 401 is located at a confined space, it can be determined that the fine dust sensor or olfactory sensor may not be activated. The processor 410 may determine whether the sensor is able to operate a sensing operation or not according to the positional relationship between the electronic device 401 and the geo-fence, and when the electronic device 401 approaches the geo-fence, the processor 410 may provide the notification of indicating whether sensing is possible or not to the user. Here, the notification can be provided to the user in the form of sound notification, vibration notification, message notification, or the like.

Figure 5:
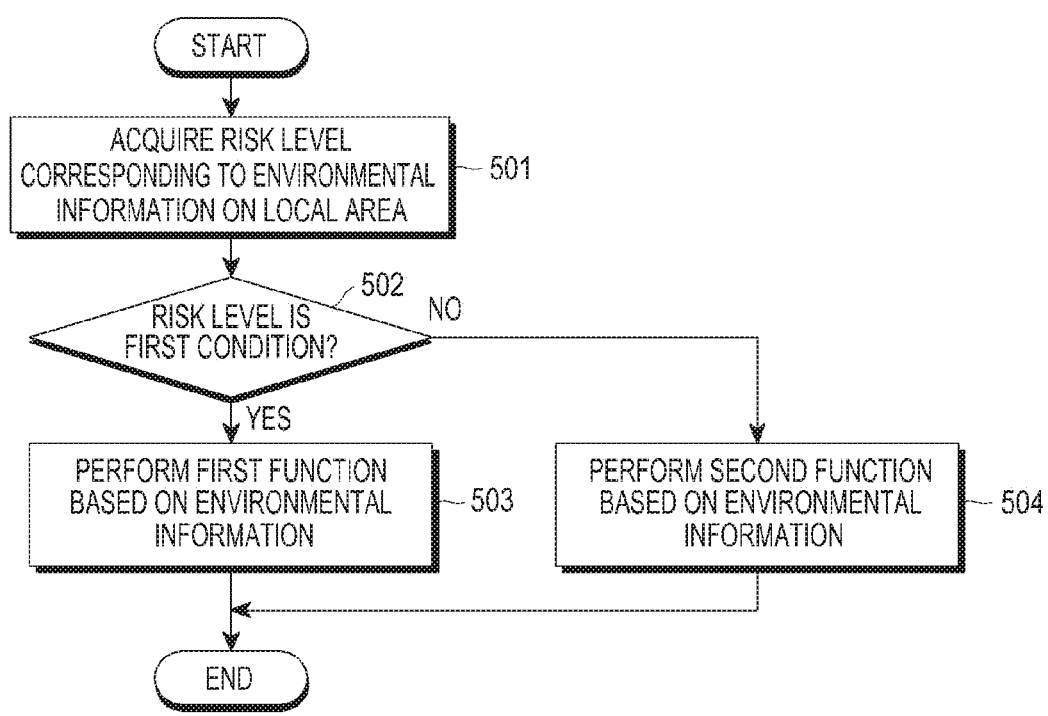
FIG. 5 is a flowchart illustrating an operation method for an electronic device based on environmental information according to an embodiment of the present disclosure.

FIG. 5 is a flowchart illustrating an operation method for an electronic device based on environmental information according to an embodiment of the present disclosure.

Hereinafter, with reference to FIG. 5, an operation method for an electronic device based on the environmental information according to various embodiments of the present disclosure will be described as follows. The method will be discussed with reference to the exemplary electronic device 401 illustrated in FIGS. 4A and 4B. However, the method can be implemented with any suitable electronic device including electronic device 101 and/or electronic device 201. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In operation 501, the electronic device 401 (for example, the communication module 420) may receive environmental information on the local area. The electronic device 401 (e.g., the processor 410) may acquire the risk level corresponding to the received environmental information. Here, the environmental information may be generated in an external electronic device (e.g., the environmental information providing server 406), and may include forecast information which forecasts atmospheric conditions such as dust, fine dust, micro dust, ozone, or ultraviolet light, temperature, atmospheric pressure, and humidity, which are linked to a local area, and special weather report information provided in real time. In addition, the environmental information may include alarm information, which issues an alarm about a dangerous situation such as disasters, diseases, accidents, etc. In addition, the environmental information may be sensing data, which has been measured from sensors of multiple electronic devices (e.g., a user equipment) and collected by the server. According to an embodiment, the electronic device 401 (for example, the processor 410) may acquire environmental information based on the information collected at the electronic device 401. According to an embodiment, the electronic device 401 (for example, the processor 410) may acquire information on dust, fine dust, micro dust, ozone, ultraviolet light, temperature, atmospheric pressure, humidity, or the like through at least one sensor (for example, the sensor module 440) functionally connected to the electronic device. According to an embodiment, the electronic device 401 (for example, the communication module 420) may receive the environmental information through an external electronic device (not shown). For example, the environmental information may be acquired through sensors (e.g., an IOT sensor) located in a neighborhood or within a predetermined geographic area corresponding to the electronic device 401 or other electronic devices (e.g., a TV, a mobile phone, etc.) located in a neighborhood or within a predetermined geographic area corresponding to the electronic device 401. In addition, the environmental information may include the risk level (for example, the concentration of dust, the concentration of fine dust, the concentration of micro dust, the concentration of ozone, a UV index, temperature, atmospheric pressure, humidity, an earthquake intensity, tidal wave strength, gas leakage, etc.) corresponding to each type of information (for example, dust, fine dust, micro dust, ozone, ultraviolet light, temperature, atmospheric pressure, humidity, disasters, diseases, accidents, etc.). Further, the environmental information may be local area information and include at least one of location information including latitude and longitude coordinates, map information which indicates by color an area associated with the environmental information, an information type, area information, text information that represents the risk level of information as a text, and geo-fence information which is configured for an area associated with the environmental information.

In operation 502, the electronic device 401 (e.g., the processor 410) may determine whether the acquired risk level corresponds to a first condition. Here, the first condition may include a case where the risk level is equal to or higher than a predetermined reference. In addition, the second condition that is opposite to the first condition may include a case where the risk level is lower than a predetermined reference. For example, when the risk level indicates an ultraviolet index and a reference of a predetermined UV Index is 100, a case where the risk level (UV index) is equal to or higher than 100 may satisfy the first condition, and a case where the risk level (UV index) is less than 99 may satisfy the second condition.

In operation 503, when the risk level corresponds to the first condition, the electronic device 401 (for example, the processor 410) may perform the first function in relation to the environmental information. The first function may be operations of determining a geo-fence based on the environmental information. According to an embodiment, the first function may be at least one of operations of: determining a geo-fence based on the environmental information; determining at least one sensor associated with the environmental information; acquiring location information of the electronic device 401 to determine a positional relationship between the electronic device 401 and the geo-fence; and controlling the operation of the determined at least one sensor according to the determined positional relationship between the electronic device 401 and the geo-fence. According to an embodiment, the first function may be at least one of operations of: determining a geo-fence based on the environmental information; determining the state of the electronic device 401 by using the at least one sensor; determining whether the at least one sensor may perform a sensing operation or not according to the state of the determined electronic device 401; and providing a notification on the determination of whether the sensor may perform the sensing operation or not depending on the determined geo-fence and the location of the electronic device 401. According to an embodiment, the first function may be operations of acquiring biometric information of the user using at least one sensor of the electronic device 401 and determining the geo-fence by adjusting the range of the sensor according to the acquired user's biometric information. Here, the user's biometric information may include at least one of the user's identification information, body information, health information, disease information, exercise information, activity information, and stress information.

In operation 504, when the risk level does not correspond to the first condition (if a second condition), the electronic device 401 (for example, the processor 410) may perform a second function in relation to the environmental information. When the risk level of the environmental information is lower than the reference, the second function may be operations of classifying the corresponding area as a non-dangerous area and not specifying the geo-fence. According to an embodiment, when there is a predetermined geo-fence for an area corresponding to the environmental information, the second function may be an operation of adjusting a range of the predetermined geo-fence based on the risk level. According to an embodiment, when there is a predetermined geo-fence for an area corresponding to the environmental information, the second function may be an operation of releasing the predetermined geo-fence based on the risk level.

Figure 6:
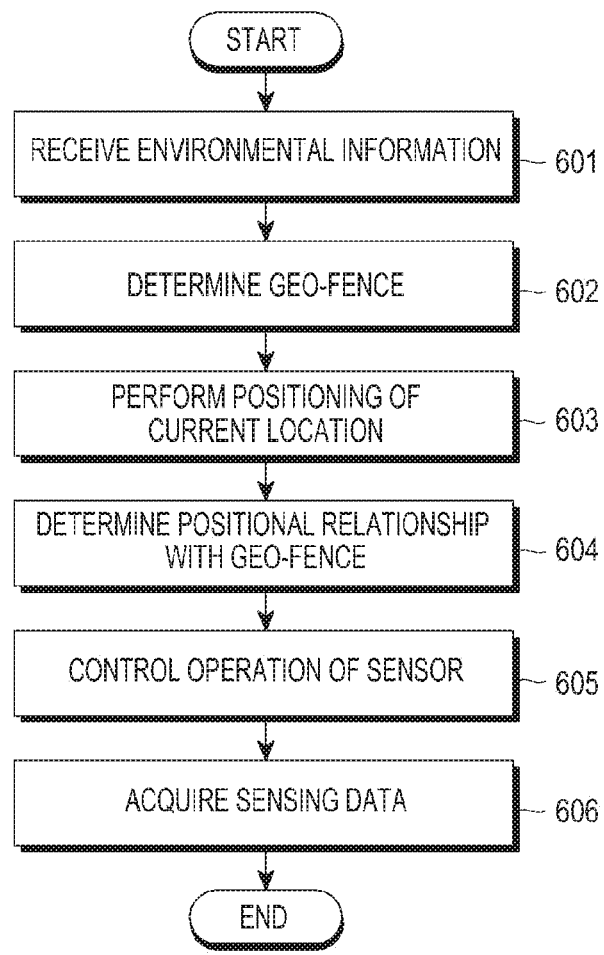
FIG. 6 is a flowchart illustrating an operation method for an electronic device based on environmental information according to an embodiment of the present disclosure.

FIG. 6 is a flowchart illustrating an operation method for an electronic device based on environmental information according to an embodiment of the present disclosure.

Hereinafter, with reference to FIG. 6, an operation method for an electronic device based on the environmental information according to various embodiments of the present disclosure will be described as follows. The method will be discussed with reference to the exemplary electronic device 401 illustrated in FIGS. 4A and 4B. However, the method can be implemented with any suitable electronic device including electronic device 101 and/or electronic device 201. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In operation 601, the electronic device 401 (for example, the communication module 420) may receive environmental information on the local area from the external electronic device 401 (for example, the environmental information providing server 406). Here, the environmental information may include forecast information on atmospheric conditions such as dust, fine dust, micro dust, ozone, ultraviolet light, temperature, atmospheric pressure, and humidity, which are linked to a local area, and may include special weather report information provided in real time. In addition, the environmental information may include alarm information, which issues an alarm about a dangerous situation such as disasters, diseases, accidents, etc. The external electronic device (for example, the environmental information providing server 406) that provides the environmental information may be, for example, a server that is operating in a national institution such as a National Weather Service, National Disaster information center, etc. In addition, the external electronic device may use a cloud computing, distributed computing, or client-server computing technology. According to an embodiment, the electronic device 401 (for example, the processor 410) may acquire environmental information based on the information collected at the electronic device 401. According to an embodiment, the electronic device 401 (for example, the processor 410) may acquire information on dust, fine dust, micro dust, ozone, ultraviolet light, temperature, atmospheric pressure, humidity, or the like through at least one sensor (for example, the sensor module 440) functionally connected to the electronic device 401. According to an embodiment, the electronic device 401 (for example, the communication module 420) may receive the environmental information through an external electronic device (not shown). For example, the environmental information may be acquired through sensors (e.g., an IOT sensor) located in a neighborhood or within a predetermined geographic area associated with the electronic device 401 or other electronic devices (e.g., a TV, a mobile phone, etc.) located in a neighborhood or within a predetermined geographic area associated with the electronic device 401. In addition, the environmental information may include the risk level (for example, the concentration of dust, the concentration of fine dust, the concentration of micro dust, the concentration of ozone, a UV index, temperature, atmospheric pressure, humidity, an earthquake intensity, tidal wave strength, gas leakage, etc.) corresponding to each type of information (for example, dust, fine dust, micro dust, ozone, ultraviolet light, temperature, atmospheric pressure, humidity, disasters, diseases, accidents, etc.).

In operation 602, the electronic device 401 (e.g., the processor 410) may determine the geo-fence which corresponds to the environmental information on the basis of the environmental information. The environmental information may include local area information on the local area, and the local area information may include at least one of location information including latitude and longitude coordinates, map information which indicates an area associated with the environmental information as color, an information type, area information, text information that represents the risk of information as a text, and geo-fence information which is configured for an area associated with the environmental information. In addition, the risk of the environmental information may be information indicating, as a numerical value or a ratio, the concentration of dust, the concentration of fine dust, the concentration of micro dust, the concentration of ozone, UV Index, temperature, pressure, humidity, an earthquake intensity, tidal wave strength, gas leakage, etc. The electronic device 401 (for example, the processor 410) may determine the geo-fence using the types of environmental information, the risk level, and local area information.

In operation 603, the electronic device 401 (e.g., the processor 410) may acquire the location information of the electronic device 401. The electronic device 401 (e.g., the communication module 420) may acquire the current location information of the electronic device 401 by performing positioning of the current location of the electronic device 401.

In operation 604, the electronic device 401 (e.g., the processor 410) may compare the acquired location information of the electronic device 401 with the geo-fence and determine the positional relationship between the electronic device 401 and the geo-fence. For example, the electronic device 401 (e.g., the processor 410) may compare the location information of the geo-fence with the location information of the electronic device 401 and determine whether the electronic device 401 is located inside or outside of the geo-fence. In addition, when the electronic device 401 is located outside of the boundary of the geo-fence, the processor may determine the distance until the electronic device 401 reaches the boundary of the geo-fence with reference to the location of the electronic device 401 and the center position of the geo-fence. In addition, when the electronic device 401 is located inside the boundary of the geo-fence, the processor may determine the distance until the electronic device 401 reaches the boundary of the geo-fence with reference to the location of the electronic device 401. In addition, the positional relationship with the geo-fence may compare the location information of the electronic device 401, which is acquired at a current time point, with the location information of the electronic device 401, which is acquired at a previous time point, and determine a travelling distance by which the electronic device 401 is moved and the change in the distance separated from the geo-fence according to the travelling of the electronic device 401.

In operation 605, the electronic device 401 (e.g., the processor 410) may control the operation of the at least one sensor that corresponds to the type of the geo-fence, according to the determined positional relationship with the geo-fence. For example, the electronic device 401 (e.g., the processor 410) may determine whether the electronic device 401 enters or leaves the geo-fence according to the positional relationship with the geo-fence. When it is determined that there is location information for the electronic device 401 indicating a location inside the boundary of the geo-fence, it may be determined that the electronic device 401 is inside the geo-fence. In addition, when it is determined that there is location information for the electronic device 401 indicating a location outside the boundary of the geo-fence, it is determined that the electronic device 401 is outside the geo-fence. In addition, when it is determined that there is location information for the electronic device 401 acquired at the previous time point indicating a location outside the boundary of the geo-fence and then there is location information for the electronic device 401 acquired at the current time point indicating a location inside the boundary of the geo-fence, it may be determined that the electronic device 401 has entered the geo-fence. Then, the electronic device 401 (for example, the sensor module 440) may start the operation of the at least one sensor corresponding to the type of the geo-fence. In addition, when it is determined that there is location information for the electronic device 401 acquired at the previous time point indicating a location inside the boundary of the geo-fence and then there is location information for the electronic device 401 acquired at the current time point indicating a location outside the boundary of the geo-fence, it may be determined that the electronic device 401 has left the geo-fence. Then, the electronic device 401 (for example, the sensor module 440) may stop the operation of the at least one sensor corresponding to the type of the geo-fence.

In operation 606, when the electronic device 401 (for example, the sensor module 440) enters the geo-fence, the operation of the at least one sensor corresponding to the type of geo-fence is started and the electronic device 401 may acquire sensing data from the operated sensor. The operation may be continued while the electronic device 401 enters the geo-fence and is located inside the boundary of the geo-fence.

FIGS. 7, 8A, 8B, 9, 10A, 10B, 10C, 11, 12A and 12B are flowcharts and diagrams illustrating a method for determining a geo-fence according to various embodiments of the present disclosure.

Hereinafter, with reference to FIGS. 7 8A, 8B, 9, 10A, 10B, 10C, 11, 12A and 12B, a method for determining a geo-fence according to various embodiments of the present disclosure will be described as follows. The method will be discussed with reference to the exemplary electronic device 401 illustrated in FIGS. 4A and 4B. However, the method can be implemented with any suitable electronic device including electronic device 101 and/or electronic device 201. In addition, although FIGS. 7, 8A, 8B, 9, 10A, 10B, 10C, 11, 12A, and 12B depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Figure 7:
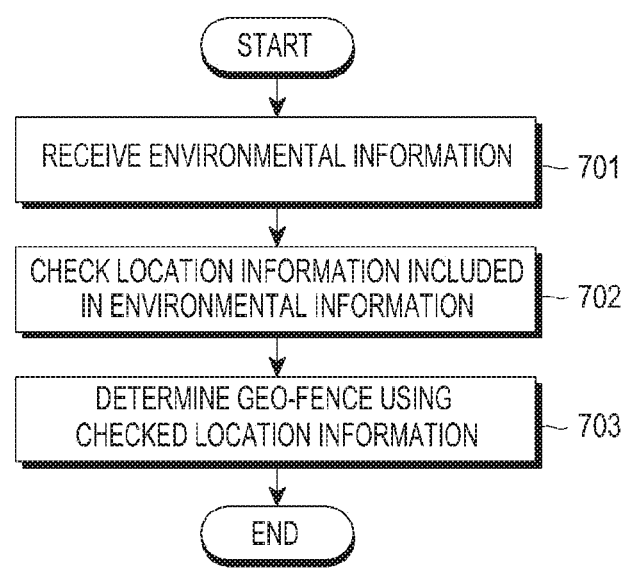
FIG. 7 is a flow chart illustrating a method for determining a geo-fence according to an embodiment of the present disclosure.

As an example of a method for determining the geo-fence according to various embodiments of the present disclosure, referring to FIGS. 7 and 8, in operation 701, the electronic device 401 (for example, the communication module 420) may receive the environmental information on the local area from the external electronic device (for example, the environmental information providing server 406).

In operation 702, the electronic device 401 (e.g., the processor 410) may check the local area information included in the environmental information, and check that the local area information is the location information including the latitude and longitude coordinates.

In operation 703, the electronic device 401 (e.g., the processor 410) may determine the geo-fence using the checked location information. The location information included in the environmental information may include one or more pieces of information including latitude and longitude coordinates. In addition, the environmental information may be associated with the type of environmental information (for example, dust, fine dust, micro dust, ozone, ultraviolet light, temperature, atmospheric pressure, humidity, disasters, diseases, accidents, etc.) and the risk level (for example, the concentration of dust, the concentration of fine dust, the concentration of micro dust, the concentration of ozone, a UV index, temperature, atmospheric pressure, humidity, an earthquake intensity, tidal wave strength, gas leakage, etc.). The electronic device 401 (for example, the processor 410) may determine the geo-fence using the types of environmental information, the risk level, and local area information. The electronic device 401 may determine the geo-fence for each type of environmental information, and may determine the geo-fence by collecting at least one piece of location information in which the risk level of the environmental information is equal to or higher than a predetermined reference.

Figures 8A, 8B:
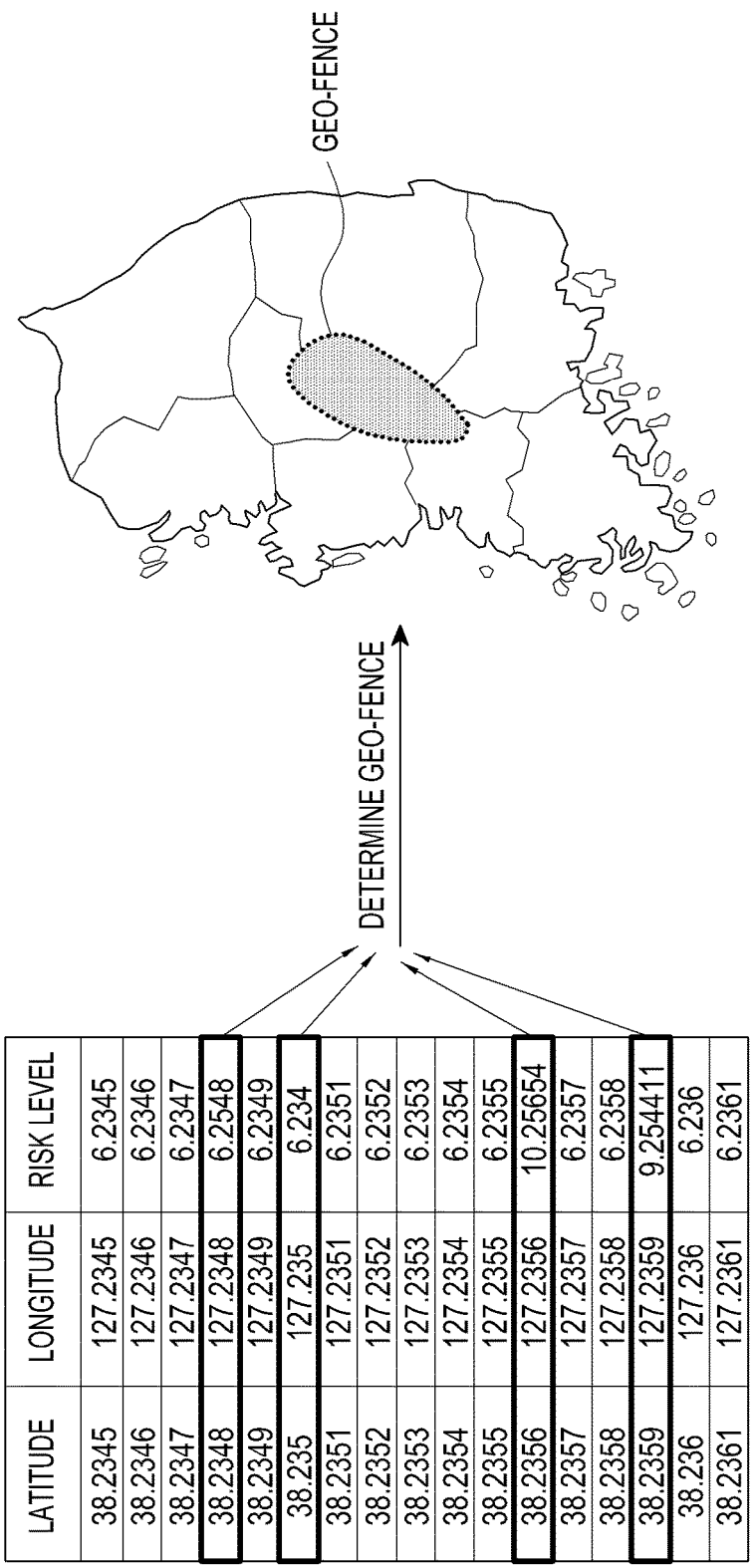
FIGS. 8A and 8B are diagrams illustrating a method for determining a geo-fence according to various embodiments of the present disclosure.
Figure 9:
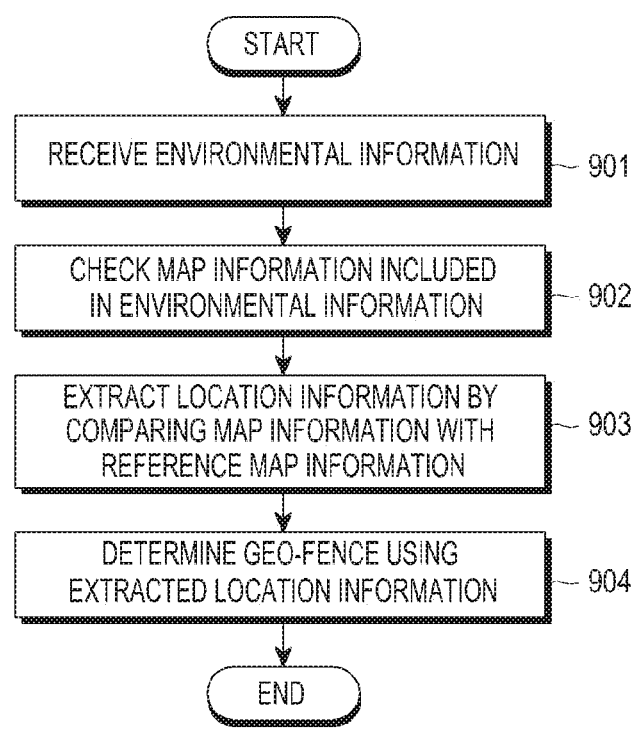
FIG. 9 is a flow chart illustrating a method for determining a geo-fence according to an embodiment of the present disclosure.

For example, referring to FIG. 8, the environmental information as shown in FIG. 8A may be information in which the risk level (numerical values) of the environmental information that corresponds to the latitude and longitude coordinates is associated therewith. The electronic device 401 may determine the geo-fence as shown in FIG. 8B, by collecting one or more location information in which the risk level of the environmental information is equal to or higher than a predetermined reference. For example, when one piece of location information in which the risk level of the environmental information is equal to or higher than the predetermined reference is present, the processor 410 may determine the point of the latitude and longitude coordinates of the location information as the center of the geo-fence, and define a constant radius with reference to the determined point to determine the geo-fence. In addition, the radius of the geo-fence may be changed based on at least one piece of information (for example, the risk level, etc.) included in the environmental information. In addition, when multiple pieces of location information in which the risk level of the environmental information is equal to or higher than the predetermined reference are present, the processor 410 may determine the geo-fence by connecting the outermost points of latitude and longitude coordinates of each location information.

As another example of a method for determining the geo-fence according to various embodiments of the present disclosure, referring to FIGS. 9, 10A, 10B, and 10C, in operation 901, the electronic device 401 (for example, the communication module 420) may receive the environmental information on the local area from the external electronic device (for example, the environmental information providing server 406).

In operation 902, the electronic device 401 (e.g., the processor 410) may check local area information included in the environmental information, and check that the local area information is map information having an image form, which indicates areas by color, in which the risk level of the environmental information for each type of the environmental information is equal to or higher than the predetermined reference.

In operation 903, the electronic device 401 (e.g., the processor 410) may determine the geo-fence using the checked map information. The electronic device 401 may compare the map information included in the environmental information with reference map information associated with the location information, that is, by which the latitude and longitude coordinates for respective points on the map can be acquired, and extract location information corresponding to the area displayed on the map information.

Figures 10A, 10B, 10C:
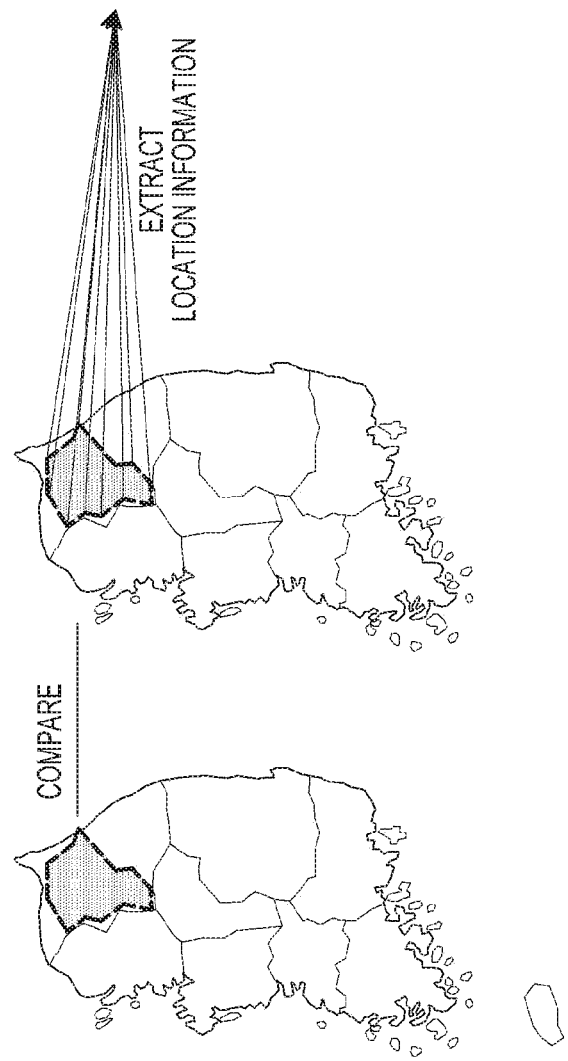
FIGS. 10A, 10B and 10C are diagrams illustrating a method for determining a geo-fence according to various embodiments of the present disclosure.

For example, referring to FIGS. 10A, 10B, and 10C, as shown in FIG. 10A, the environmental information may be map information in an image form, in which areas are divided and displayed by color using the risk level of at least one type of environmental information based on a predetermined reference. The electronic device 401 (e.g., the processor 410) may compare the map information included in the environmental information with the reference map information, by which latitude and longitude coordinates for respective points on the map can be acquired, as shown in FIG. 10B. Then, the electronic device 401 may extract location information corresponding to an area displayed on the map information of the environmental information, as shown in FIG. 10C.

In operation 904, the electronic device 401 (e.g., the processor 410) may determine the geo-fence using the extracted location information.

Although not shown in the drawing, the environmental information may include text information. The text information included in the environmental information may be used to determine the geo-fence. The text information included in the environmental information may be information in a form of messages in which the types of environmental information, the risk level, and location or area are represented by text. The electronic device 401 may analyze a sentence structure of the text information included in the environmental information, extract location information corresponding to an area displayed in the text information, and determine the geo-fence using the extracted location information.

In addition, the external electronic device (for example, the environmental information providing server 406) may determine the geo-fence and geo-fence information according thereto may be included in the environmental information. The electronic device 401 (for example, the processor 410) may determine the geo-fence using the geo-fence information included in the environmental information.

Figure 11:
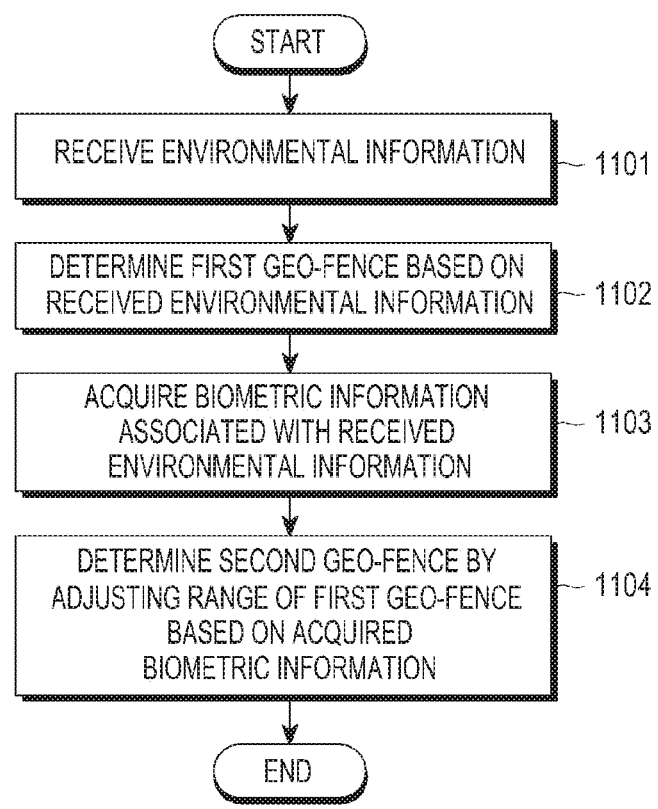
FIG. 11 is a flow chart illustrating a method for determining a geo-fence according to an embodiment of the present disclosure.

As another example of a method for determining the geo-fence according to various embodiments of the present disclosure, referring to FIG. 11, in operation 1101, the electronic device 401 (for example, the communication module 420) may receive environmental information on a local area from the external electronic device (for example, the environmental information providing server 406).

In operation 1102, the electronic device 401 (e.g., the processor 410) may determine a first geo-fence on the basis of the environmental information.

In operation 1103, the electronic device 401 (for example, the processor 410) may acquire the user's biometric information by using at least one sensor (e.g., the sensor module 440). In addition, the electronic device 401 (for example, the communication module 420) may acquire the user's biometric information by receiving a user's biometrics information from the outside. In addition, the electronic device 401 (e.g., the memory 430) may store, read, and acquire the user's biometric information. The user's biometric information may include at least one of the user's identification information, body information, health information, disease information, exercise information, activity information, and stress information.

In operation 1104, the electronic device 401 (e.g., the processor 410) may adjust the range of the first geo-fence based on the acquired user's biometric information to determine a second geo-fence. The electronic device 401 (for example, the processor 410) may analyze the acquired user's biometric information to determine an environmental factor to which the user is vulnerable. For example, when it is determined that the user has a respiratory disease as a result of analyzing the user's biometric information, the electronic device 401 (for example, the processor 410) may determine the geo-fence such that the range of the geo-fence is adjusted to be wider as long as the type of the environmental information is related to the fine dust and various toxic substances that are associated with the respiratory disease. On the other hand, when it is determined that the user is very healthy as a result of analyzing the user's biometric information, the electronic device 401 may determine the geo-fence by adjusting the range thereof to be narrower.

Figure 12A:
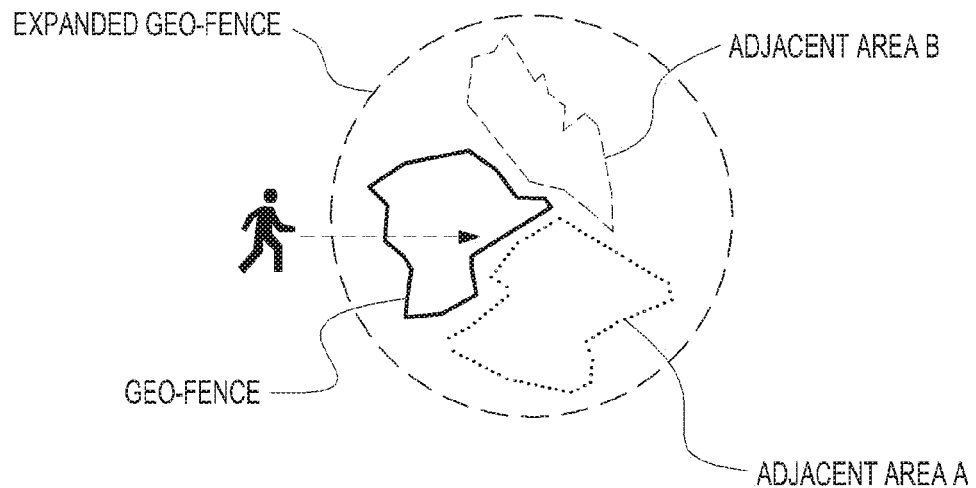
FIGS. 12A and 12B are diagrams illustrating a method for determining a geo-fence according to various embodiments of the present disclosure.

A method for determining the geo-fence according to various embodiments of the present disclosure is described with reference to FIG. 12A and FIG. 12B, and as shown in FIG. 12A, the electronic device 401 (for example, the processor 410) may determine the geo-fence by extending the determined geo-fence to an area adjacent to the user's moving direction, in a situation where the geo-fence is determined and the user's location (for example, a location associated with the electronic device 401) is tracked, and when the environmental information that is the same as or similar to the determined geo-path type is received with respect to an area(adjacent area A, adjacent area B) adjacent to the user's moving direction and the risk level of the received environmental information is equal to or higher than the predetermined reference or approaches the determined geo-fence.

Figure 12B:
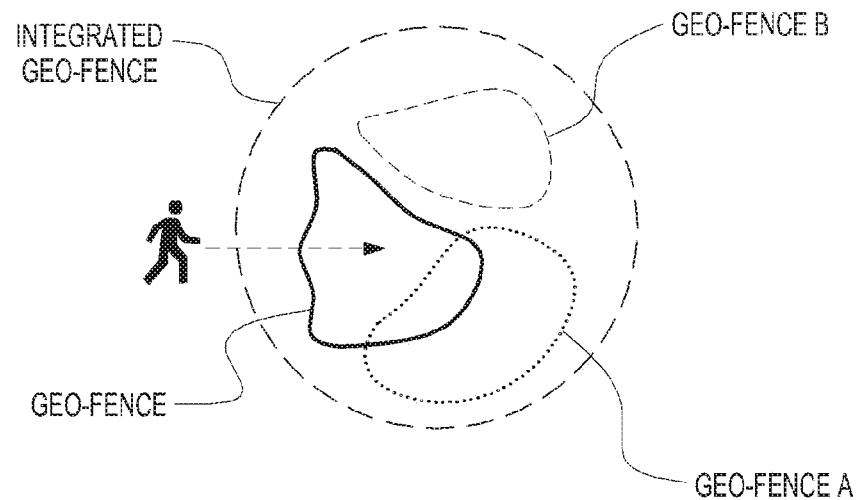

In addition, as shown in FIG. 12B, when the geo-fence is determined, and there is another geo-fence (geo-fence A) which is at least partially overlapped with the range of the determined geo-fence or one other geo-fence (geo-fence B) which is adjacent thereto, the electronic device 401 (e.g., the processor 410) may determine an integrated geo-fence by integrating the ranges of the determined geo-fence and a second geo-fence.

Figure 13:
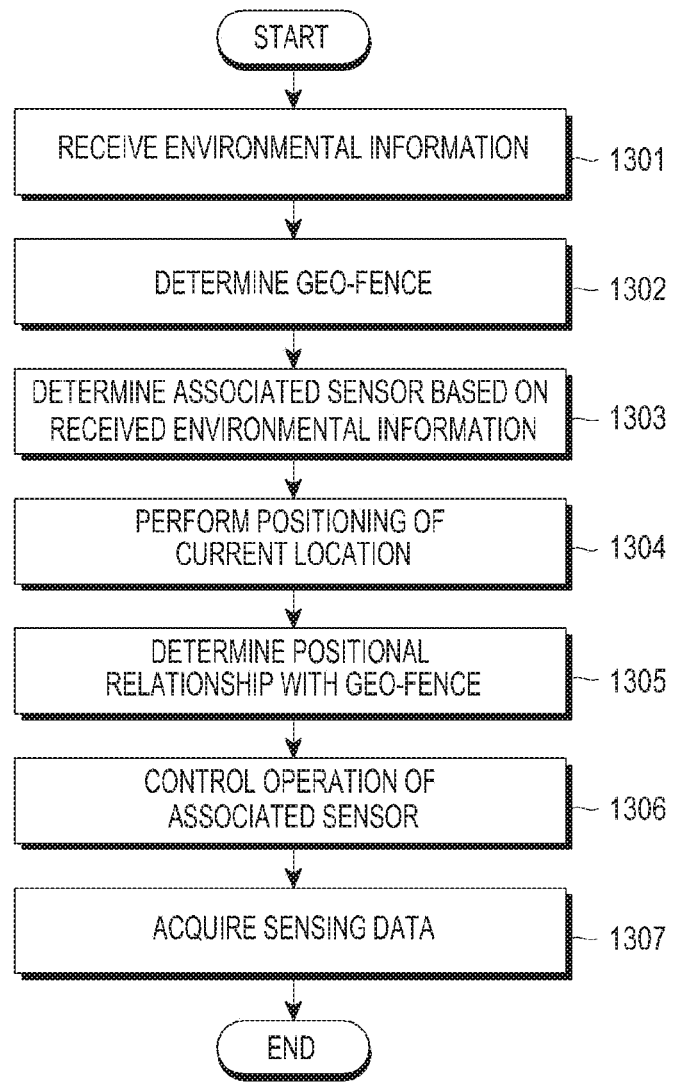
FIG. 13 is a flow chart illustrating a method for controlling an operation of a sensor according to an embodiment of the present disclosure.

FIG. 13 is a flow chart illustrating a method for controlling an operation of a sensor according to an embodiment of the present disclosure.

Hereinafter, with reference to FIG. 13, a method for controlling an operation of a sensor according to various embodiments of the present disclosure will be described as follows.

In operation 1301, the electronic device 401 (for example, the communication module 420) may receive environmental information on the local area from the external electronic device (for example, the environmental information providing server 406).

In operation 1302, the electronic device 401 (e.g., the processor 410) may determine the geo-fence that corresponds to the environmental information on the basis of the received environmental information.

In operation 1303, the electronic device 401 (e.g., the processor 410) may determine at least one sensor associated with the environmental information on the basis of the received environmental information. The electronic device 401 (e.g., the processor 410) may determine at least one sensor associated with the type of the environmental information among one or more sensors. For example, when the type of the environmental information is fine dust, the electronic device 401 (for example, the processor 410) may determine, as a sensor associated with the environmental information, a fine dust sensor that can measure the concentration of the fine dust and an olfactory sensor that can measure various toxic substances.

In operation 1304, the electronic device 401 (e.g., the communication module 420) may acquire the current location information of the electronic device 401 by performing positioning of the current location of the electronic device 401.

In operation 1305, the electronic device 401 (e.g., the processor 410) may compare the acquired location information of the electronic device 401 with the geo-fence and determine the positional relationship with the geo-fence.

In operation 1306, the electronic device 401 (e.g., the processor 410) may control the operation of the at least one sensor which is determined to correspond to the type of the geo-fence according to the determined positional relationship with the geo-fence.

In operation 1307, when it is determined that the electronic device 401 (for example, the processor 410) enters to the inside the geo-fence according to the location relationship with the geo-fence, the electronic device 401 may start the operation of the sensor and acquire the sensing data from the sensor. The operation may be continued while the electronic device 401 enters the geo-fence and is located inside the boundary of the geo-fence.

Figure 14:
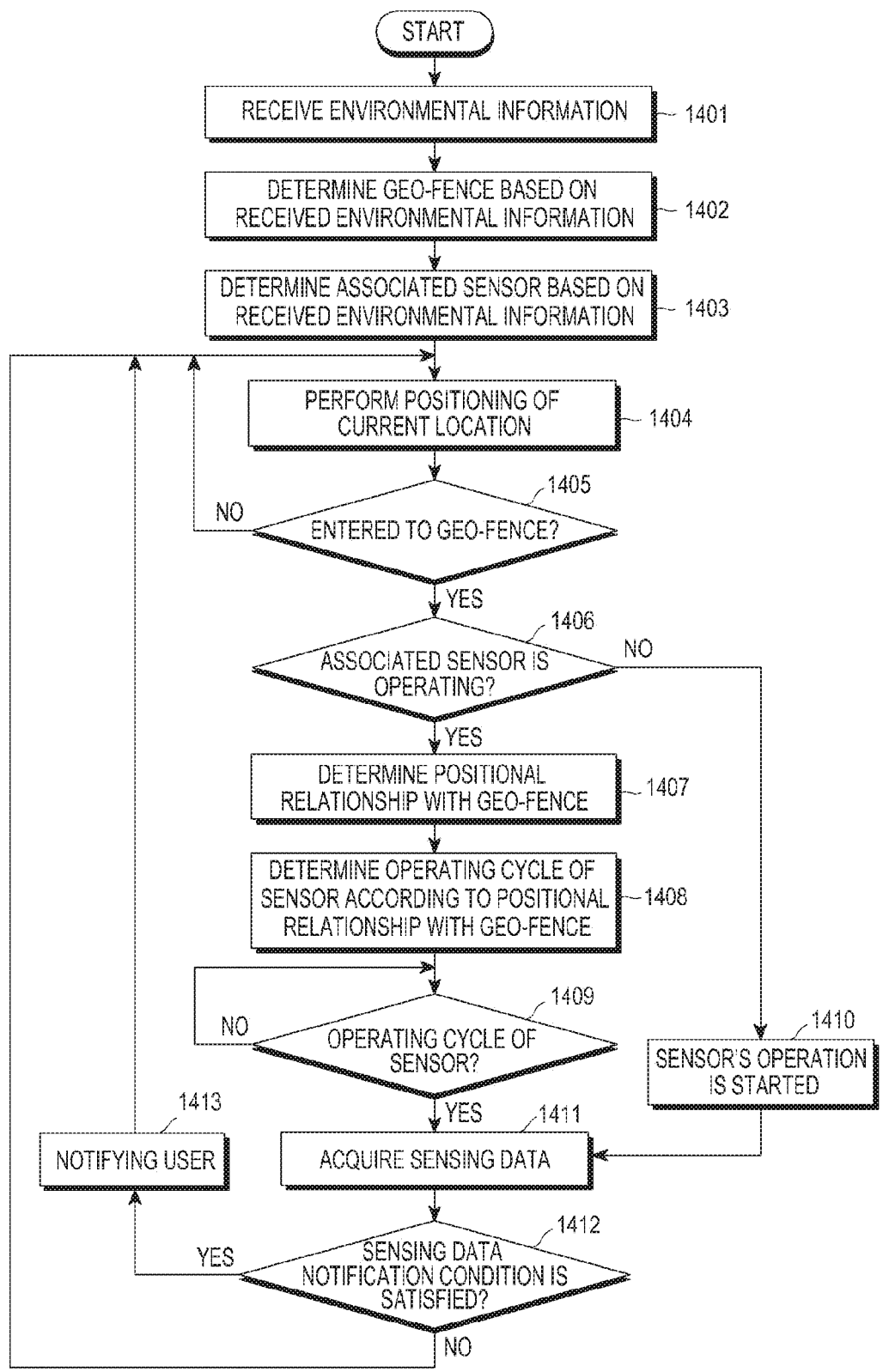
FIG. 14 is a flowchart illustrating an operation method for an electronic device according to an embodiment of the present disclosure.
Figure 15:
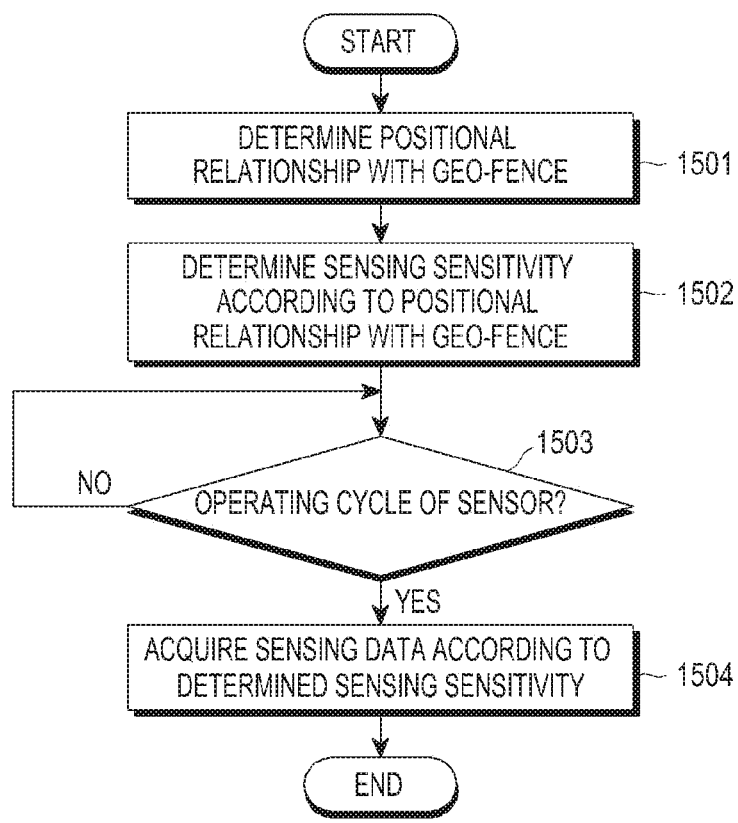
FIG. 15 is a flow chart illustrating a method for controlling an operation of a sensor according to an embodiment of the present disclosure.
Figure 16:
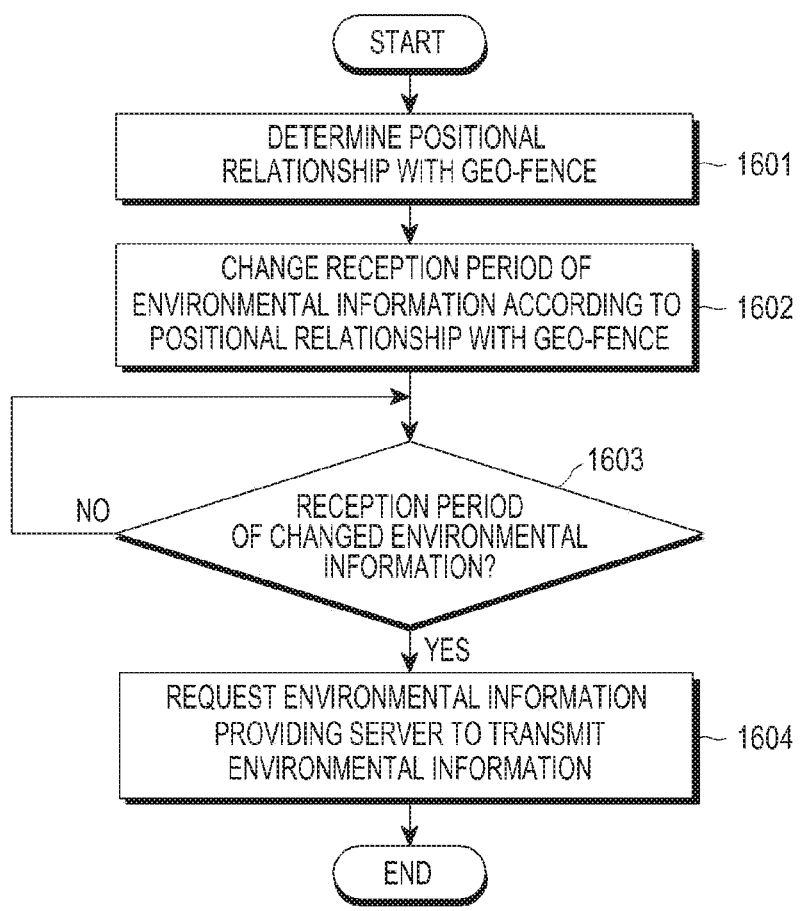
FIG. 16 is a flow chart illustrating a method for requesting environmental information according to an embodiment of the present disclosure.

FIGS. 14 to 16 are flowcharts illustrating an operation method for an electronic device according to an embodiment of the present disclosure.

Hereinafter, with reference to FIGS. 14-16, operation methods for an electronic device according to an embodiment of the present disclosure will be described as follows. The method will be discussed with reference to the exemplary electronic device 401 illustrated in FIGS. 4A and 4B. However, the method can be implemented with any suitable electronic device including electronic device 101 and/or electronic device 201. In addition, although FIGS. 14-16 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 14, in operation 1401, the electronic device 401 (for example, the communication module 420) may receive environmental information on a local area from the external electronic device (for example, the environmental information providing server 406).

In operation 1402, the electronic device 401 (e.g., the processor 410) may determine the geo-fence that corresponds to the environmental information on the basis of the received environmental information.

In operation 1403, the electronic device 401 (e.g., the processor 410) may determine at least one sensor associated with the geo-fence on the basis of the received environmental information.

In operation 1404, the electronic device 401 (e.g., the communication module 420) may acquire the current location information of the electronic device 401 by performing positioning of the current location of the electronic device 401.

In operation 1405, the electronic device 401 (e.g., the processor 410) may compare the acquired location information of the electronic device 401 with the geo-fence and determine whether the electronic device 401 enters the inside of the geo-fence.

In operation 1406, when the electronic device 401 enters the inside of the geo-fence, the electronic device 401 (e.g., the processor 410) may determine whether at least one sensor associated with the geo-fence determined in the operation 1403 starts an operation. In operation 1407, when the associated sensor is being operated, the electronic device 401 (e.g., the processor 410) may compare the geo-fence with the location information of the electronic device 401 to determine the positional relationship with the geo-fence.

In operation 1408, the electronic device 401 (e.g., the processor 410) may determine an operating cycle of the sensor according to the positional relationship with the determined geo-fence. As the electronic device 401 enters inside the geo-fence and approaches the center of the geo-fence, the operating cycle of the sensor can be adjusted to be shorter. On the contrary, as the electronic device 401 gets further away from the center of the geo-fence, the operating cycle of the sensor may be adjusted to be longer. This is for providing a more accurate sensing service to the user by more frequently acquiring sensing data from the sensor because an environmental factor according to the type of geo-fence, for example, the concentration of fine dust may increase when the electronic device 401 gets more closely associated to the inside the geo-fence. On the contrary, this is for reducing the power consumption of the electronic device 401 by relatively less often acquiring sensing data from the sensor because an environmental factor according to the type of the geo-fence, for example, the concentration of the fine dust may be decreased when the electronic device 401 gets further away from the center of the geo-fence.

When the determined operating cycle of the sensor arrives in operation 1409, the electronic device 401 (e.g., the processor 410) may acquire sensing data from the sensor, in operation 1411.

Meanwhile, when the electronic device 401 enters inside the geo-fence in operation 1406 and at least one sensor associated with the geo-fence determined in the operation 1403 does not start an operation, the electronic device 401 (e.g., the processor 410) may start the operation of the associated at least one sensor in operation 1410. In addition, in operation 1411, the electronic device 401 (e.g., the processor 410) may acquire sensing data from the sensor according to the initiation of the operation of the sensor.

In operation 1412, the electronic device 401 (e.g., the processor 410) may provide a sensing service based on the geo-fence, using the acquired sensing data. When the information of the acquired sensing data is equal to or higher than the predetermined reference, the electronic device 401 (for example, the processor 410) may notify of the risk fact to the user by an alarm, in operation 1413.

A method for operating an electronic device according to various embodiments of the present disclosure is shown in FIG. 15. Referring to FIG. 15, in operation 1501, the electronic device 401 (e.g., the processor 410) may determine the positional relationship with the geo-fence.

In operation 1502, the electronic device 401 (e.g., the processor 410) may determine the sensing sensitivity of the sensor according to the positional relationship with the geo-fence. As the electronic device 401 enters inside the geo-fence and approaches the center of the geo-fence, the sensing sensitivity of the sensor can be adjusted to be lower. On the contrary, as the electronic device 401 gets further away from the center of the geo-fence, the sensing sensitivity of the sensor can be adjusted to be higher. When the electronic device 401 gets closely associated with the inside the geo-fence and an environmental factor according to the type of the geo-fence, for example, the concentration of fine dust increases, accurate sensing data can be acquired but the sensitivity of the sensor is reduced. Then, the electronic device 401 can have an effect of reducing power consumption by reducing the sensing sensitivity while maintaining the accuracy of the sensing data.

When the operating cycle of the sensor arrives in operation 1503, the electronic device 401 (e.g., the processor 410) may acquire sensing data from the sensor, in operation 1504.

An operation method for an electronic device according to various embodiments of the present disclosure is shown in FIG. 16. Referring to FIG. 16, in operation 1601, the electronic device 401 (e.g., the processor 410) may determine the positional relationship with the geo-fence.

In operation 1602, the electronic device 401 (e.g., the processor 410) may change the reception period of the environmental information according to the positional relationship with the geo-fence. That is, when a positional relationship between the electronic device 401 and the geo-fence gets closer, the reception period of the environmental information can be shortened. On the contrary, when the positional relationship between the electronic device 401 and the geo-fence gets further, the reception period of the environmental information can be longer.

In operation 1603, when the reception period of the changed environmental information arrives, in operation 1604, the electronic device 401 (e.g., the processor 410) may request an environmental information providing server (for example, the environmental information providing server 406) to transmit the environmental information or may request a change of the period set in the environmental information providing server.

Figure 17:
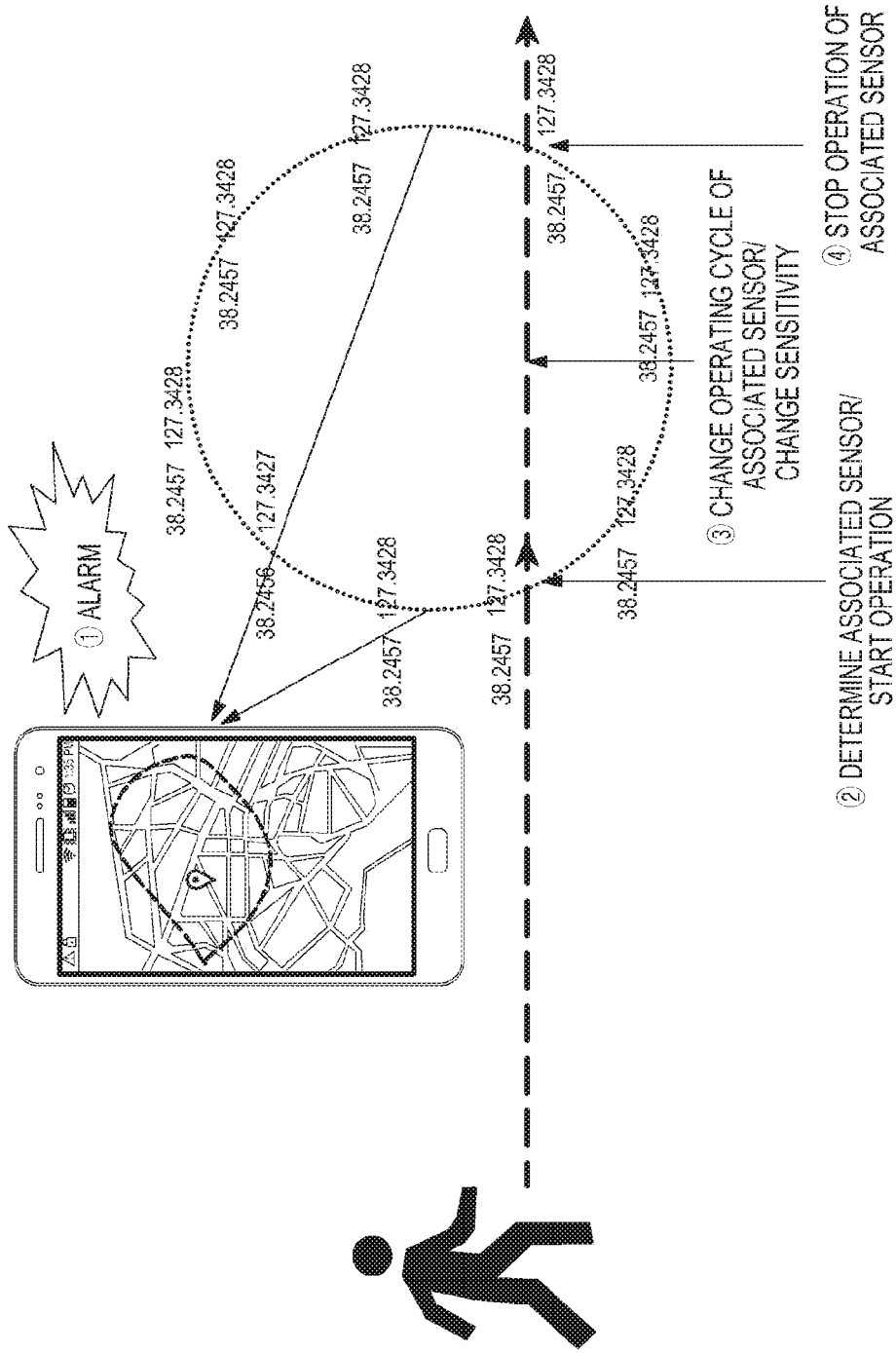
FIG. 17 is a diagram illustrating an operation method for an electronic device according to an embodiment of the present disclosure.
Figure 18:
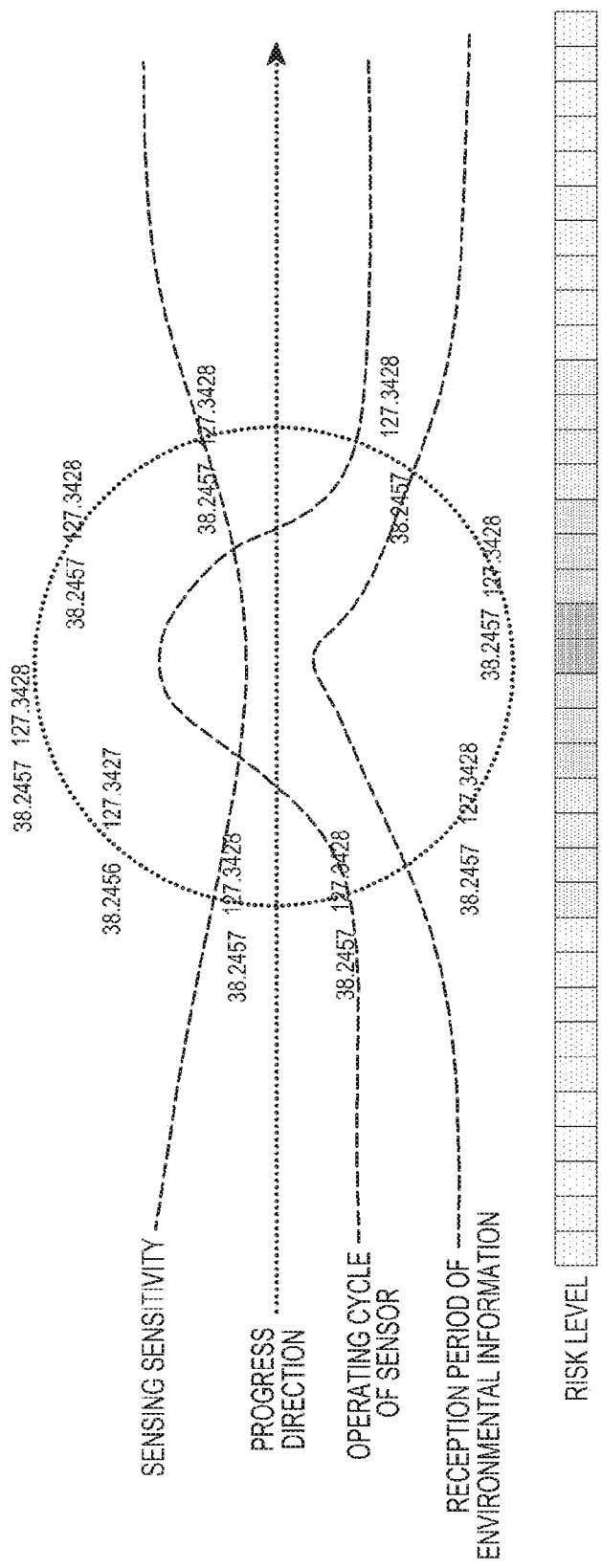
FIG. 18 is a diagram illustrating an operation method for an electronic device according to an embodiment of the present disclosure.

FIGS. 17 and 18 are diagrams illustrating an operation method for an electronic device according to various embodiments of the present disclosure. The method can be implemented using any suitable electronic device including electronic device 101, electronic device 201, and/or electronic device 401.

Referring to FIG. 17, a user, that is, an electronic device that the user is wearing may move. When the electronic device is slowly approaching the geo-fence and enters inside the geo-fence, the fact of entering the geo-fence may be provided to the user with an alarm (indicated by reference numeral ①).

When entering inside the geo-fence, the electronic device may determine at least one sensor associated with the type of the geo-fence and starts the operation of the determined sensor (indicated by reference numeral ②).

As the electronic device has more closely entered inside the geo-fence, the electronic device may change the operating cycle of the determined sensor. In addition, the sensing sensitivity of the determined sensor can be changed (indicated by reference numeral ③).

When the electronic device passes the center of the inside the geo-fence, further away from the inside the geo-fence, and progresses to the outside of the geo-fence, the operation of the at least one sensor associated with the type of the geo-fence can be stopped (indicated by reference numeral ④).

The operating cycle of the sensor, the sensing sensitivity of the sensor, the reception period of the environmental information, or the like according to the positional relationship with the geo-fence are illustrated in FIG. 18, and as shown in FIG. 18, when the risk level of the environmental factor (numerical value or ratio) is the highest at the center of the geo-fence, in a process where the user enters the geo-fence from the outside the geo-fence, passes through the inside thereof, and progresses to the outside of the geo-fence again, the sensor can be configured to have the lowest sensitivity at the center of the geo-fence. In addition, the operating cycle of the sensor and the reception period of the environmental information may be set as the shortest one at the center of the geo-fence, and thus a large number of acquisitions of the sensing data and a large number of receptions of the environmental information can be set.

Figure 19:
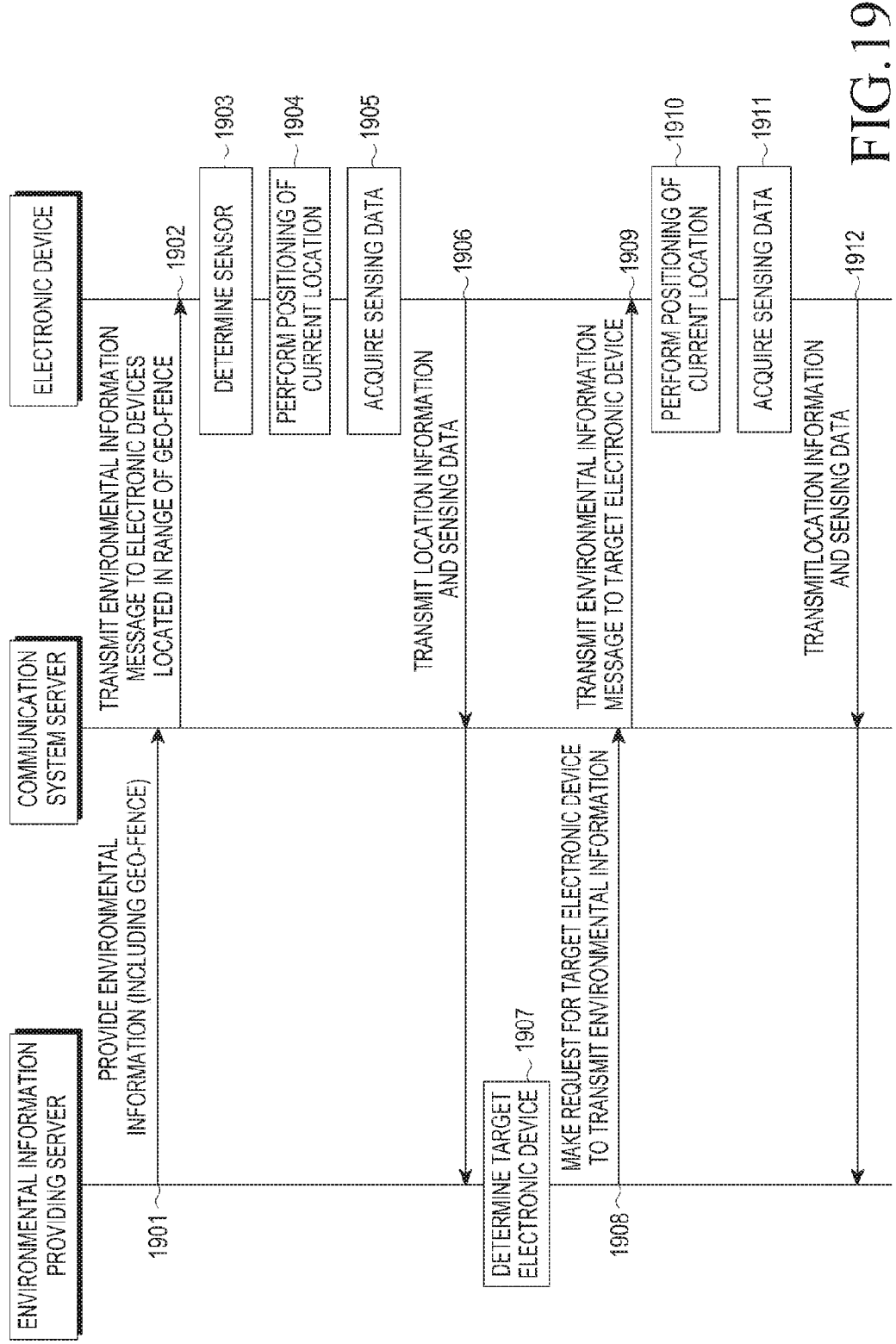
FIG. 19 is a flowchart illustrating an operation method for a system for operating an electronic device based on environmental information according to an embodiment of the present disclosure.
Figure 20:
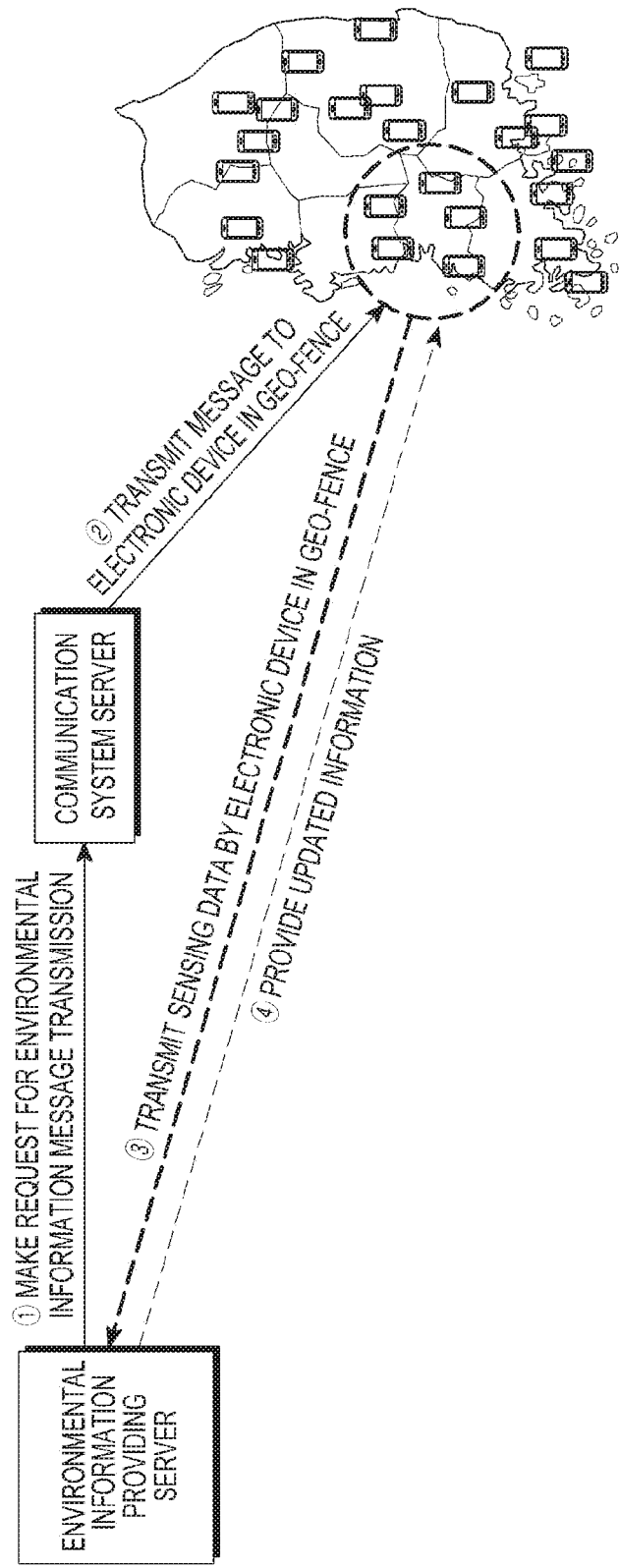
FIG. 20 is a flowchart illustrating an operation method for a system for operating an electronic device based on environmental information according to an embodiment of the present disclosure.

FIG. 19 is a flowchart illustrating an operation method for a system for operating an electronic device based on environmental information according to an embodiment of the present disclosure, and FIG. 20 is a flowchart illustrating an operation method for a system for operating an electronic device based on environmental information according to various embodiments of the present disclosure.

Hereinafter, with reference to FIGS. 19 and 20, an operation method for an electronic device based on the environmental information according to various embodiments of the present disclosure will be described as follows. The method can be implemented using any suitable electronic device including electronic device 101, electronic device 201, and/or electronic device 401.

Referring to FIGS. 19 and 20, in operation 1901, an environmental information providing server (for example, the environmental information providing server 406) may transmit environmental information including a geo-fence to a communication system server such that the environmental information including the geo-fence can be provided to multiple electronic devices existing in the geo-fence area, and may request the transmission thereof (indicated by reference numeral ① in FIG. 20). Here, the environmental information may be information including text information that can be provided in the form of a short message.

In operation 1902, the communication server may check the geo-fence included in the environmental information and collectively transmit the environmental information message to multiple electronic devices located in the geo-fence (indicated by reference numeral ② in FIG. 20).

In operation 1903, an electronic device (one of the multiple electronic devices located in the geo-fence) may receive the environmental information message, analyze the sentence structure of text information included in the received environmental information message, and determine at least one sensor that corresponds to the type of the determined environmental information.

In operation 1904, the electronic device may perform positioning of the current location of the electronic device, and acquire current location information through the location positioning.

In operation 1905, the electronic device may start the operation of at least one sensor, which is associated with the environmental information and acquire the sensing data from the sensor.

In operation 1906, the electronic device may transmit again the acquired sensing data and location information to the environmental information providing server through the communication system server (indicated by reference numeral 3 in FIG. 20). Here, it is preferable to provide the sensing data from the electronic device to the environmental information providing server only when the user of the electronic device authenticates the transmission of sensing data. However, the present disclosure is not limited thereto and may automatically transmit the sensing data without the user's authentication.

In operation 1907, when the sensing data are received from the plurality of electronic devices, the environmental information providing server may determine an accuracy of the received sensing data by comparing the received sensing data with sensing data of another electronic device, and determine, as a target electronic device, an electronic device from which sensing data having a high accuracy is provided. In addition, the environmental information providing server may determine, as a target electronic device, an electronic device from which sensing data is transmitted, among the plurality of electronic devices.

In operation 1908, the environmental information providing server may transmit the environmental information configured by the target electronic device to the communication system server such that the environmental information can be provided to the determined target electronic device, and may request the transmission therefor (indicated by reference numeral ④ in FIG. 20). However, the environmental information providing server is not limited to providing the environmental information only to the target electronic device, and the environmental information can be transmitted to an electronic device existing in an area associated with the corresponding environmental information, irrespective of the target electronic device.

In operation 1909, the communication system server may transmit the environmental information message to the target electronic device configured by the environmental information.

In operation 1910, when the environmental information message is received, the electronic device may perform positioning of current location of the electronic device, and acquire the current location information through the location positioning.

In operation 1911, the electronic device may start the operation of at least one sensor, which is associated with the environment information and acquire the sensing data from the sensor.

In operation 1912, the electronic device may transmit again the acquired sensing data and location information to the environment information providing server through the communication system server.

Figure 21:
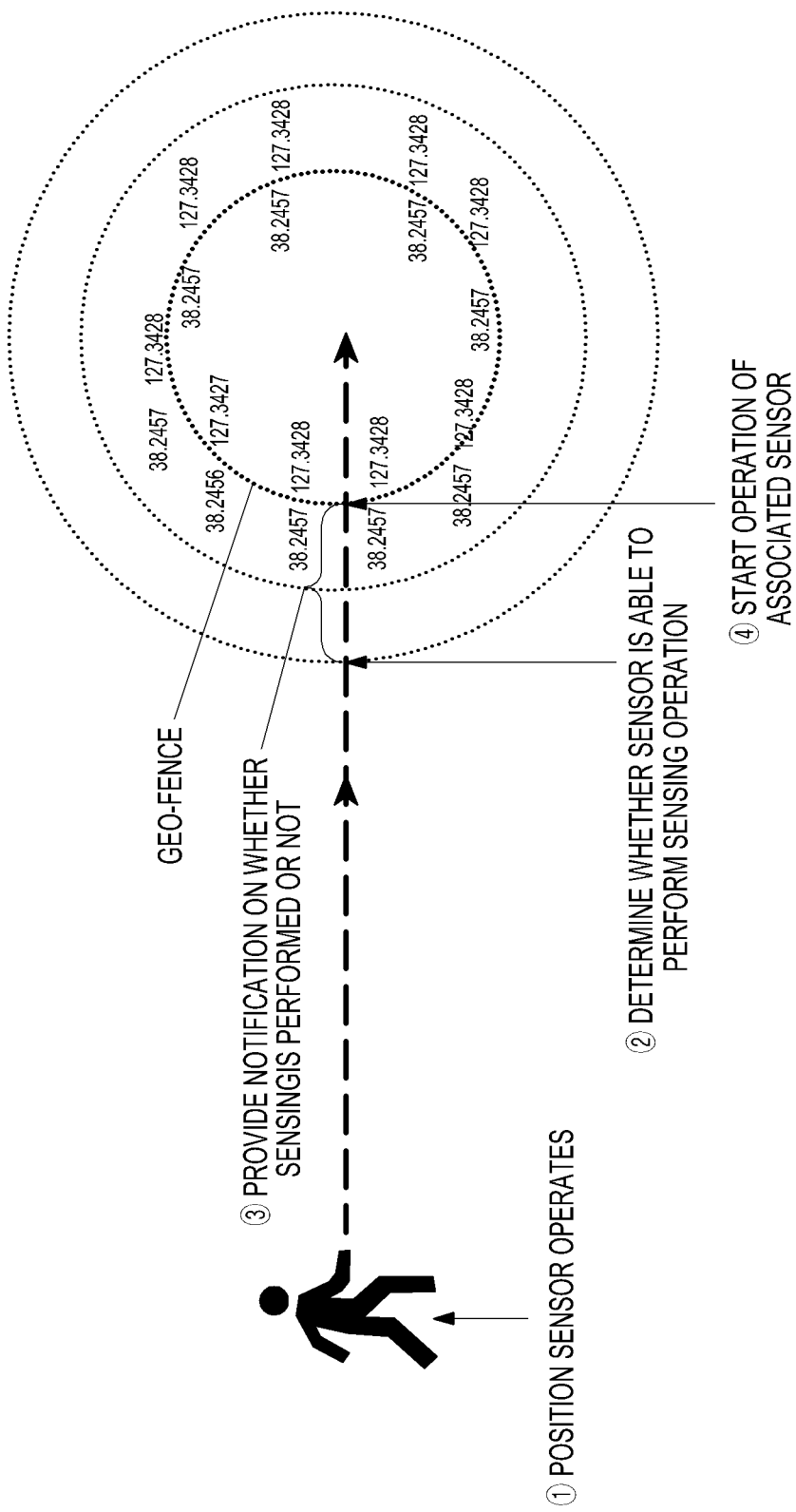
FIG. 21 is a diagram illustrating an operation method for an electronic device according to an embodiment of the present disclosure.

FIG. 21 is a diagram illustrating an operation method for an electronic device according to an embodiment of the present disclosure. The method can be implemented using any suitable electronic device including electronic device 101, electronic device 201, and/or electronic device 401.

Referring to FIG. 21, a user, that is, an electronic device that the user is wearing may move. The electronic device may start the operation of a position sensor (indicated by reference numeral ①). The electronic device can track the position through the operation of the position sensor, and it can be seen that the electronic device is approaching a geo-fence.

When the electronic device gradually approaches the geo-fence and reaches a location that is a predetermined range away from the geo-fence, the electronic device may determine the state of the electronic device by using at least one sensor included in the electronic device, and determine whether the at least one sensor is able to perform a sensing operation according to the state of the electronic device (indicated by reference numeral ②).

When the electronic device more closely approaches the geo-fence and reaches a location a predetermined range away from the geo-fence and more close to the geo-fence than a point in which the state of the electronic device is determined, the electronic device may provide, to a user, a notification on the determination of whether the sensor is able to perform a sensing operation (indicated by reference numeral ③).

When the electronic device more closely approaches and enters the geo-fence, the electronic device may start the operation of the at least one sensor associated with the geo-fence (indicated by reference numeral ④).

As described above, the electronic device may determine whether a sensing operation is able to be performed by a sensor that is lexicographically associated with a geo-fence before entering the inside of the geo-fence, and thus the user enables the sensor to operate in the optimum state.

Figure 22:
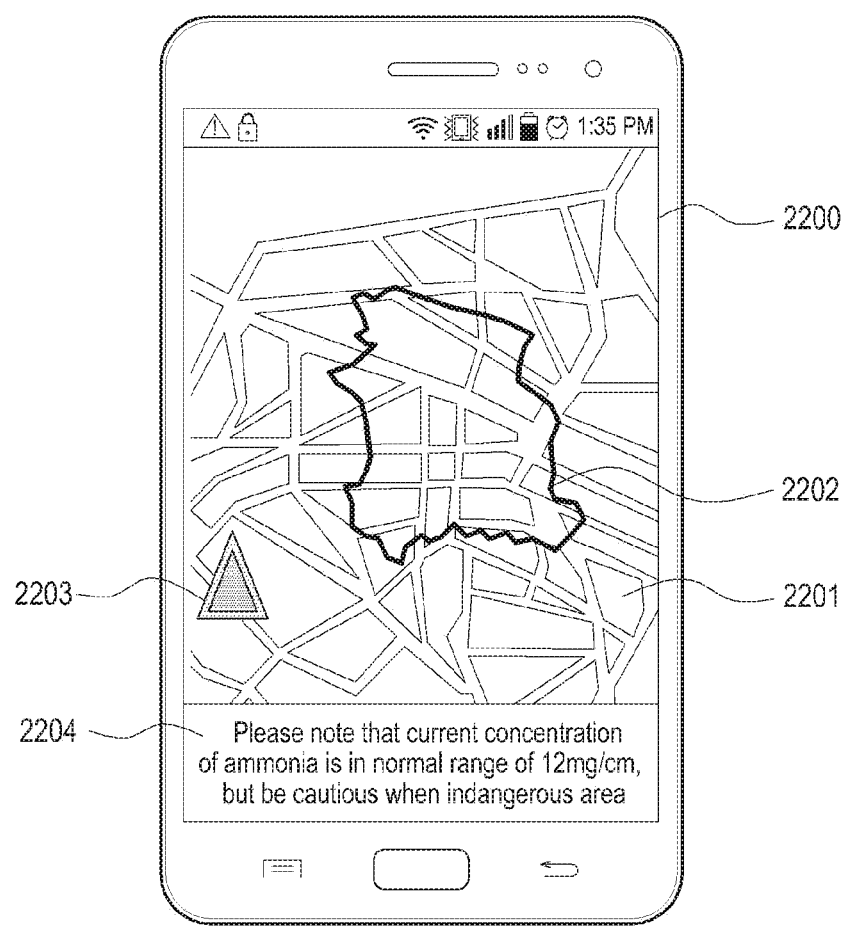
FIG. 22 is a diagram illustrating a screen of a geo-fence service based on environmental information according to an embodiment of the present disclosure.

FIG. 22 is a diagram illustrating a screen of a geo-fence service based on environment information according to an embodiment of the present disclosure.

Referring to FIG. 22, a map 2201 may be displayed on a screen 2200 associated with an application of a geo-fence service based on the environment information according to various embodiments of the present disclosure. Further, a geo-fence 2202 is determined to be displayed on the map 2201. Furthermore, on the screen 2200, the current location 2203 of the user may be displayed on the map 2201 in which the geo-fence 2202 is displayed. In addition, a guidance message 2204 which guides the current atmosphere state of the geo-fence 2202 may be displayed on the screen 2200. The guidance message 2204 may be a guide speech which can be provided before entering the geo-fence 2202. In addition, when the user enters inside the geo-fence 2202, the guidance message 2204 may provide information of the sensing data acquired by the sensor of the user's electronic device in real time.

Figure 23:
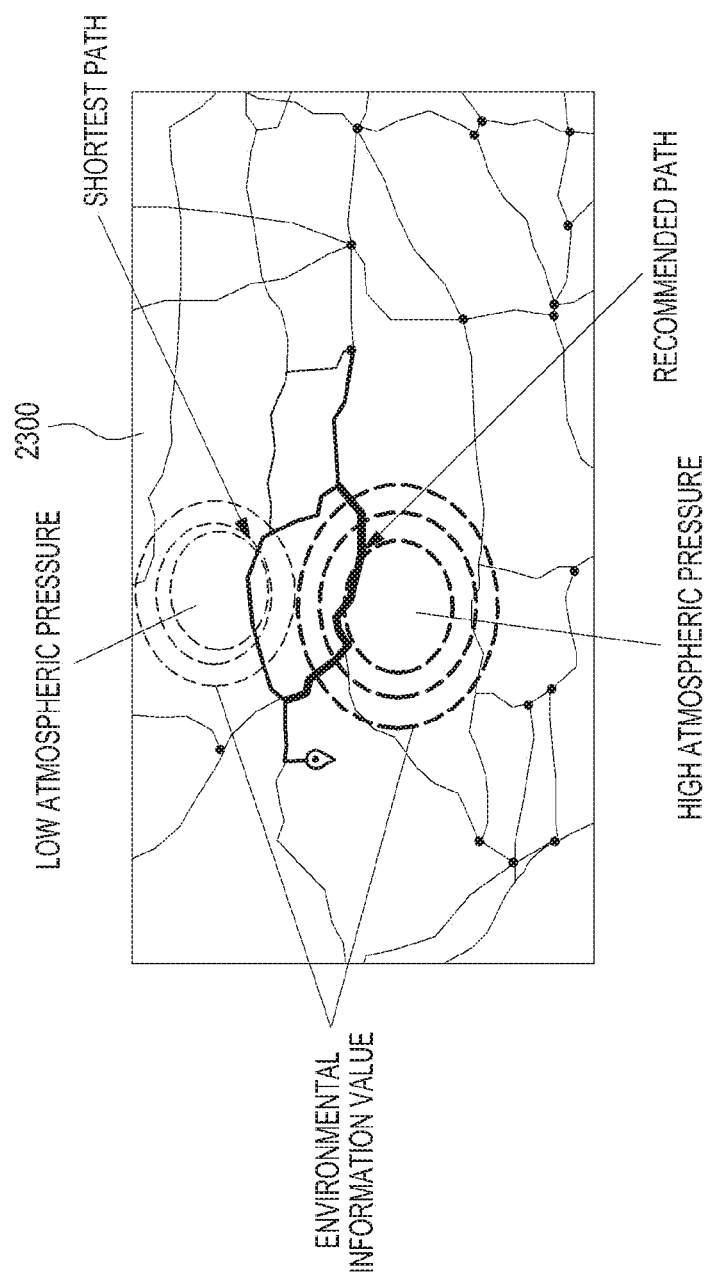
FIG. 23 is a diagram illustrating a screen of a geo-fence service based on environmental information according to an embodiment of the present disclosure.

FIG. 23 is a diagram illustrating a screen of a geo-fence service based on environment information according to an embodiment of the present disclosure.

Referring to FIG. 23, a screen 2300 associated with an application of a geo-fence service based on the environment information according to various embodiments of the present disclosure illustrates a diagram in which the geo-fence service based on the environment information of the present disclosure is applied to a navigation function. The electronic device may determine geo-fences in a neighborhood or within a predetermined geographic area associated with the electronic device based on the environment information. FIG. 23 illustrates an example of a case where the user is suffering from arthritis, and the electronic device may receive environmental information on atmospheric pressure and determine the geo-fence on the basis of the environmental information on atmospheric pressure.

The electronic device may provide a recommendation path for the user suffering from arthritis in the process of setting a route guidance of the navigation by providing information on the determined geo-fence in the process of setting the route guide of the navigation.

Figures 24A, 24B:
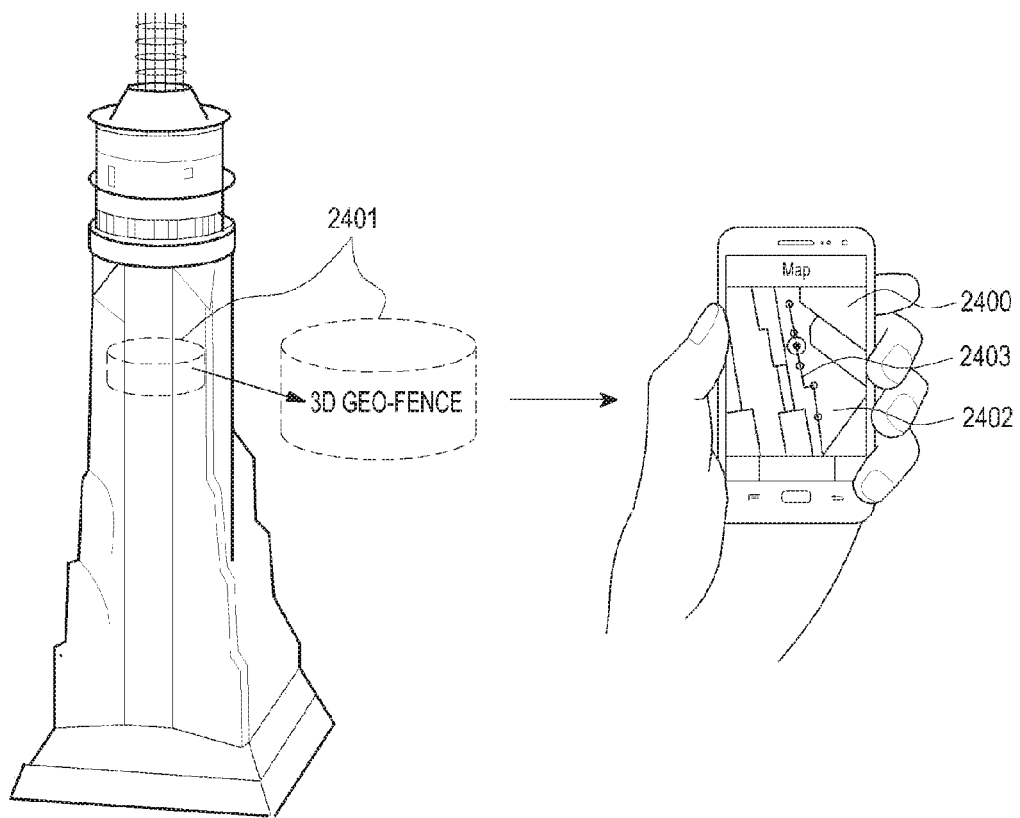
FIGS. 24A and 24B are diagrams illustrating an exemplary system elements associated with a geo-fence service based on environmental information according to various embodiments of the present disclosure.

FIGS. 24A and 24B are diagrams illustrating exemplary system elements associated with a geo-fence service based on environment information according to various embodiments of the present disclosure.

Referring to FIGS. 24A and 24B, according to the geo-fence service based on the environment information according to various embodiments of the present disclosure, as shown in FIG. 24A, when the risk factor occurs inside the building, a layer of the building where the corresponding risk factor occurs can be distinguished and a 3D geo-fence 2401 can be set. In addition, as shown in FIG. 24B, the geo-fence service screen 2400 may display the internal drawing or floor plan 2402 of the building so that the user can safely escape the risk area when the user is located in the 3D geo-fence 2401. In addition, an escape route 2403 of the user may be displayed on the internal drawing 2402.

While the present disclosure has been shown and described with reference to various embodiments thereof, it will be understood by those skilled in the art that various changes in form and details may be made therein without departing from the spirit and scope of the present disclosure as defined by the appended claims and their equivalents. This description is not necessarily intended to be exhaustive or to limit the invention to the precise embodiments disclosed. The specification describes specific examples to accomplish a more general goal that may be accomplished in another way. Those skilled in the art will appreciate that the features described above can be combined in various ways to form multiple variations of the invention.

What is claimed is:

1. An electronic device comprising:
a first sensor configured to obtain location information of the electronic device;
a plurality of second sensors; and
at least one processor configured to:
receive, from an external electronic device, environmental information corresponding to a predefined area,
identify, a first risk type of the predefined area and a first risk level associated with the first risk type of the predefined area, based on the environmental information,
in response to identifying that a part of the predefined area has a second risk level equal to or higher than a reference risk level of the first risk type, determine a first geo-fence related to the first risk type using location information corresponding to the part of the predefined area, based on the identified first risk type of the part of the predefined area, and
in response to identifying that the electronic device enters the first geo-fence by using location information of the electronic device obtained from the first sensor, obtain sensing data from at least one sensor associated with the first risk type from among the plurality of second sensors.

2. The electronic device of claim 1, wherein the environmental information includes risk type information about dust, fine dust, micro dust, ozone, ultraviolet light, temperature, atmospheric pressure, humidity, disasters, diseases, or accidents associated with the predefined area.

3. The electronic device of claim 1, wherein the environmental information includes location information, map information, text information, or geo-fence information corresponding to the predefined area.

4. The electronic device of claim 1, wherein the at least one processor is further configured to:
in response to identifying that the part of the predefined area has the second risk level equal to or higher than the reference risk level of the first risk type, perform a first function, and
in response to identifying that another part of the predefined area having a third risk level is lower than the reference risk level of the first risk type, perform a second function.

5. The electronic device of claim 4, wherein the at least one processor is further configured to perform the first function to:
obtain the location information of the electronic device by the first sensor,
determine a positional relationship between the electronic device and the first geo-fence, and
control the at least one sensor associated with the first risk type from among the plurality of second sensors according to the positional relationship between the electronic device and the first geo-fence.

6. The electronic device of claim 5, wherein the at least one processor is further configured to:
compare map information included in the environmental information with reference map information,
obtain location information corresponding to a first part of the predefined area using a result of the comparison of the map information, and
determine the first geo-fence using the location information corresponding to the first part of the predefined area.

7. The electronic device of claim 5, wherein the at least one processor is further configured to:
analyze a sentence structure of text information included in the environmental information,
obtain location information corresponding to a second part of the predefined area using a result of the analysis of the sentence structure, and
determine the first geo-fence using the location information corresponding to the second part of the predefined area.

8. The electronic device of claim 5, wherein the at least one processor is further configured to:
determine the first geo-fence using geo-fence information included in the environmental information.

9. The electronic device of claim 5, wherein the at least one processor is further configured to perform the first function to:
determine an operating cycle of the at least one sensor associated with the first risk type from among the plurality of second sensors according to the positional relationship between the electronic device and the first geo-fence, and
obtain the sensing data from the at least one sensor according to the operating cycle.

10. The electronic device of claim 5, wherein the at least one processor is further configured to perform the first function to:
determine sensing sensitivity of the at least one sensor associated with the first risk type from among the plurality of second sensors according to the positional relationship between the electronic device and the first geo-fence, and
obtain the sensing data from the at least one sensor according to the sensing sensitivity.

11. The electronic device of claim 5, wherein the at least one processor is further configured to perform the first function to:
determine whether at least a portion of a second geo-fence is within a predetermined range of the first geo-fence, or the first geo-fence and the second geo-fence are overlapped, and
determine a third geo-fence by combining the first geo-fence and a range of the second geo-fence.

12. The electronic device of claim 5, wherein the at least one processor is further configured to perform the first function to:
modify a time period for detecting the environmental information based on the positional relationship between the electronic device and the first geo-fence.

13. The electronic device of claim 4, wherein the at least one processor is further configured to perform the first function to:
determine a state of the electronic device by using one or more sensors associated with the state of the electronic device from among the plurality of sensors,
determine whether the one or more sensors are able to perform a sensing operation according to the state of the electronic device, and
provide a notification corresponding to the determination of whether the sensing operation is performed according to a location of the electronic device.

14. The electronic device of claim 4, wherein the at least one processor is further configured to perform the first function to:
- obtain biometric information of a user using at least one biometric sensor from among the plurality of sensors, and
- adjust a range of the first geo-fence according to the biometric information.

15. The electronic device of claim 14, wherein the biometric information includes identification information, physical information, health information, disease information, exercise information, activity information, or stress information.

16. The electronic device of claim 1, further comprising:
- an interface configured to transmit the sensing data to the external electronic device if the sensing data is obtained from the at least one sensor associated with the first risk type from among the plurality of second sensors.

17. The electronic device of claim 4, wherein the at least one processor is further configured to perform the second function to:
- determine whether there is a predetermined geo-fence, and
- if the predetermined geo-fence exists, adjust a range of the predetermined geo-fence based on the third risk level, or release the predetermined geo-fence.

18. A method for controlling an electronic device comprising:
- receiving, from an external electronic device, environmental information corresponding to a predefined area;
- identifying, a first risk type of the predefined area and a first risk level associated with the first risk type of the predefined area, based on the environmental information;
- in response to identifying that a part of the predefined area has a second risk level equal to or higher than a reference risk level of the first risk type, determining a first geo-fence related to the first risk type using location information corresponding to the part of the predefined area, based on the identified first risk type of the part of the predefined area; and
- in response to identifying that the electronic device enters the first geo-fence by using location information of the electronic device obtained from a first sensor of the electronic device, obtaining sensing data from at least one sensor associated with the first risk type from among a plurality of second sensors of the electronic device.

19. The method of claim 18, further comprising:
- in response to identifying that the part of the predefined area has the second risk level equal to or higher than the reference risk level of the first risk type, performing a first function, and
- in response to identifying that another part of the predefined area having a third risk level is lower than the reference risk level of the first risk type, performing a second function.

* * * * *